(12) United States Patent
Pohjola et al.

(10) Patent No.: US 11,186,113 B2
(45) Date of Patent: Nov. 30, 2021

(54) INTEGRATED FLOATING IMAGE FOR SECURITY DOCUMENTS

(71) Applicants: GEMALTO COGENT INC, Pasadena, CA (US); GEMALTO OY, Vantaa (FI)

(72) Inventors: Teemu Pohjola, Vantaa (FI); Christopher Knud Haas, Pasadena, CA (US)

(73) Assignees: THALES DIS FRANCE SA, Meudon (FR); THALES DIS USA, Inc., Austin, TX (US)

( * ) Notice: Subject to any disclaimer, the term of this patent is extended or adjusted under 35 U.S.C. 154(b) by 0 days.

(21) Appl. No.: 16/539,084

(22) Filed: Aug. 13, 2019

(65) Prior Publication Data
US 2021/0046779 A1    Feb. 18, 2021

(51) Int. Cl.
| | |
|---|---|
| *B42D 25/351* | (2014.01) |
| *B42D 25/21* | (2014.01) |
| *B42D 25/342* | (2014.01) |
| *B42D 25/435* | (2014.01) |
| *B42D 25/47* | (2014.01) |
| *C09J 7/38* | (2018.01) |

(52) U.S. Cl.
CPC .......... *B42D 25/351* (2014.10); *B42D 25/21* (2014.10); *B42D 25/342* (2014.10); *B42D 25/435* (2014.10); *B42D 25/47* (2014.10); *C09J 7/385* (2018.01)

(58) Field of Classification Search
CPC .... B42D 25/351; B42D 25/435; B42D 25/47; B42D 25/21; B42D 25/342; C09J 7/38
USPC .... 283/67, 70, 72, 74, 94, 98, 109, 110, 901
See application file for complete search history.

(56) References Cited

U.S. PATENT DOCUMENTS

| | | | | |
|---|---|---|---|---|
| 3,639,040 | A | * | 2/1972 | Tylka, Sr. ............... G03B 33/00 359/720 |
| 4,636,054 | A | * | 1/1987 | Saegusa ................... G03B 7/20 396/234 |
| 9,289,962 | B2 | | 3/2016 | Chen-Ho |
| 10,017,001 | B2 | | 7/2018 | Chen-Ho |
| 2013/0154250 | A1 | | 6/2013 | Dunn et al. |
| 2015/0053341 | A1 | | 2/2015 | Chen-Ho |
| 2018/0229536 | A1 | * | 8/2018 | Gettens ................ B42D 25/355 |

OTHER PUBLICATIONS

M.C. Hutley, et al., The moiré magnifier, Pure Appl. Opt. 3 (1994), pp. 133-142,National Physical Laboratory, Teddington, United Kingdom.

\* cited by examiner

*Primary Examiner* — Justin V Lewis
(74) *Attorney, Agent, or Firm* — The Jansson Firm; Pehr B. Jansson

(57) ABSTRACT

Security article and method for producing a security article. The method includes microprinting on a patch an array of microimages, placing a first translucent layer over the substrate and first patch, and laminating the substrate, the patch, and the first translucent layer using a lamination tool. The resulting security product includes a microlens array is located in the first translucent layer in register with the patch such that microimages have a one-to-one correspondence with lenses of the array of microlenses, wherein when the microimage array is viewed by a viewer through the microlens array, a composite image is visible to a viewer of the security article.

19 Claims, 15 Drawing Sheets

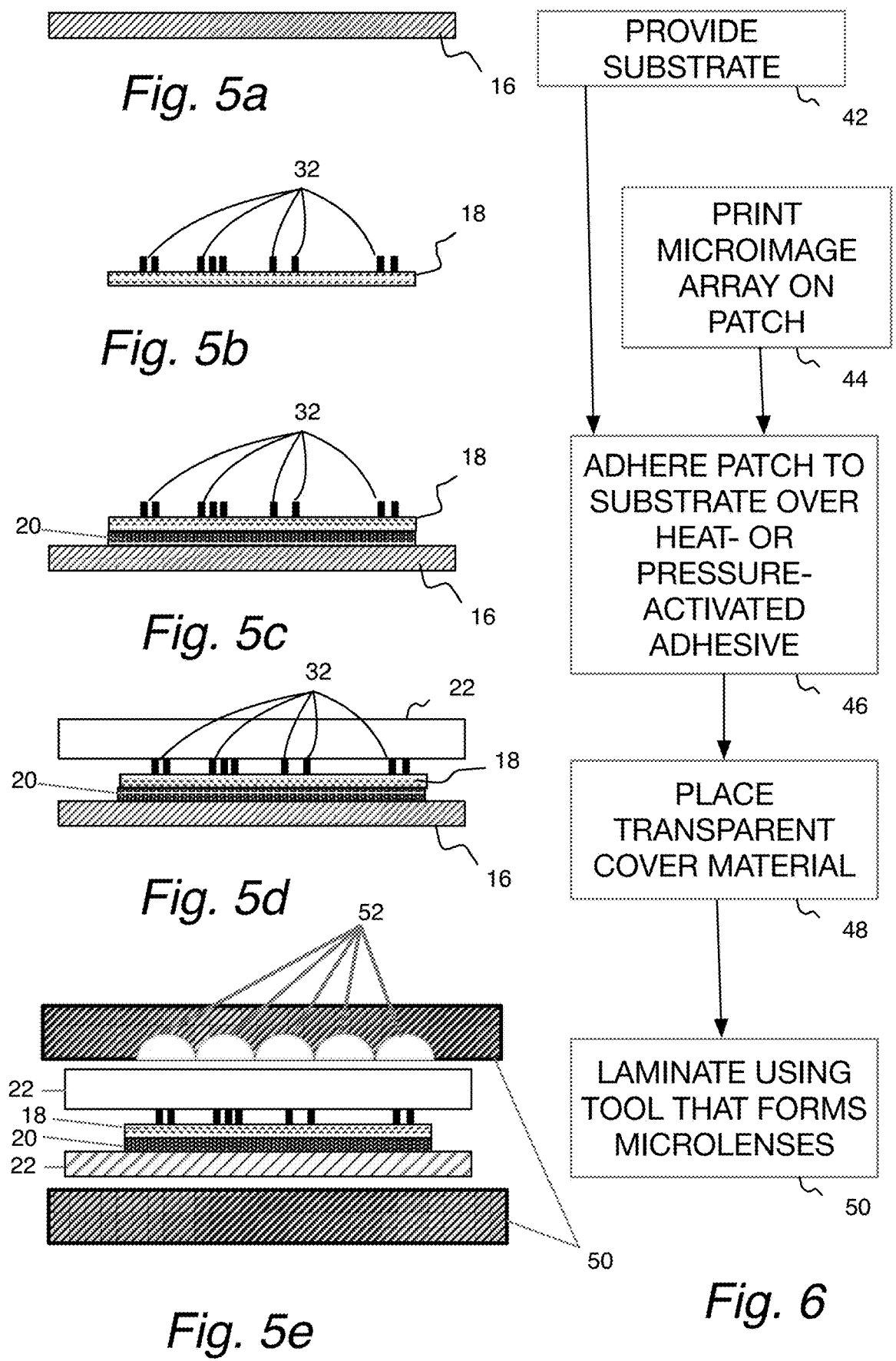

INTEGRATED FLOATING IMAGE FOR SECURITY DOCUMENTS

BACKGROUND OF THE INVENTION

The present invention relates generally to security articles, and more particularly to security articles having patches of microimages that appear as integrated images.

A security article is an item which requires a form of protection. The protection element of an article can take several forms, e.g. an embedded chip, owner photograph, or signature to be duplicated on a credit card. A more advanced security article may be manufactured with the means to produce a black and white integrated image, sometimes referred to as a composite image, which is formed by combining a two-dimensional array of microlenses with well-registered high-resolution microimages located at the focal depth of the microlenses. The visual system of a person looking at the microimages, through the microlens array, integrates the microimages, which are magnified by the microlens array, generating a virtual image, known as an integrated image. By adjusting the apparent height or depth of the microimages, the integrated image can be made to appear to float above or below the surface of the security article as a security feature. Such integrated images may, for example, be produced by laser engraving an array of microimages through a microlens array. This technology is described in co-assigned patent application Ser. No. 13/713,808, "PERSONALIZED SECURITY ARTICLE AND METHODS OF AUTHENTICATING A SECURITY ARTICLE AND VERIFYING A BEARER OF A SECURITY ARTICLE" to Dunn et al.

The addition of color floating images to security documents is further described in US. Pat. Publ. US 2015-0053341 A1 for "PROCESSING TAPES FOR PREPARING LAMINATE ARTICLES" to Kui Chen-Ho et al. (abandoned), U.S. Pat. No. 9,289,962 for "LASER-PERSONALIZABLE SECURITY ARTICLES" to Kui Chen-Ho et al., and U.S. Pat. No. 10,017,001 for "LASER-PERSONALIZABLE SECURITY ARTICLES" to Kui Chen-Ho et al.

While color floating images provide a valuable security feature, the microlens sheeting that covers security articles may interfere with placement of other security features and personalization on a security article.

In current manufacturing techniques, polycarbonate credentials are typically formed by fusing together different layers of polycarbonate using heat and pressure. As a result of this, prior art techniques where the image layer is polycarbonate are prone to movement during the lamination process that joins these layers. Such movement results in a loss of registration between microimages forming composite images and the microlens layer.

The Kui et al. references cited above rely on printing of microimages on a polycarbonate layer. This technique has been found to be very costly.

Prior art techniques that cause the formation of the microimages in the same layer as the microlenses suffers the drawback that the security feature, i.e., the microimage array used to produce a floating image formed in combination with microlenses, is contained entirely on one layer. Thus, the security feature may be separated from a security article by merely removing one layer. That layer could then be manipulated or added to a fraudulent security article.

From the foregoing it is apparent that there is a need for an improved method to provide striking color floating images that are difficult to mimic or manipulate.

SUMMARY

A method for producing a security article, the method includes microprinting on a patch an array of microimages, placing a first translucent layer over the substrate and first patch, and laminating the substrate, the patch, and the first translucent layer using a lamination tool such that after the laminating step a microlens array is located in the first translucent layer in register with the patch such that for a plurality of microimages of the array of microimages on the patch each microimage has a one-to-one correspondence with a microlens in the array of microlenses, wherein when the microimage array is viewed by a viewer through the microlens array, a composite image is visible to a viewer of the security article.

In an aspect, the method further includes adhering the microprinted first patch on a first section of the substrate over a first heat- or pressure-activated adhesive layer.

In another aspect, the method includes adhering the microprinted first patch to a first section of the translucent layer under a second heat- or pressure-activated adhesive layer.

In another aspect, the lamination tool includes an array of recesses located such that the lamination produces the microlens array in the first translucent layer in register with the patch.

In another aspect, the first translucent layer contains a microlens array and the laminating step includes placing the microlens array of the first translucent layer in register with the patch.

In another aspect, the pitch and skew angle of the microimage array and of the microlens array are essentially the same.

In another aspect, the skew angle of the microimage array with respect to the substrate and the skew angle of the microlens array with respect to the substrate are within three degrees.

In another aspect, the difference in pitch of the microimage array and the pitch of the microlens array are within three percent.

In another aspect, the method further includes placing a second heat- or pressure-activated adhesive layer between the patch and the translucent layer.

In another aspect, the cohesive force of the microimage patch is less than the adhesive force between the translucent layer containing the microlens array and the patch thereby increasing the chance of separation of the patch from the first translucent layer in the event of a tampering attempt seeking to separate the microimage array and corresponding microlens array from the substrate.

In another aspect, the adhesive force of the first adhesive layer is greater than the adhesive force of the second adhesive layer thereby increasing the chance of separation of the patch from the first translucent layer in the event of a tampering attempt seeking to separate the microimage array and corresponding microlens array from the substrate.

In another aspect, the method further includes placing at least one additional translucent layer between the patch and the first translucent layer, wherein one of the at least one additional translucent layer has a cohesive force that is smaller than the cohesive force of the first translucent layer, the substrate, and the patch, thereby increasing the chance of separation of the patch from the first translucent layer in the event of a tampering attempt seeking to separate the microimage array and corresponding microlens array from the substrate.

In another aspect, the step of microprinting the microimages is performed by printing UV-curable resin on the patch.

In another aspect, the step of microprinting the microimages is performed by ablating the microimages into a metalized layer of the patch.

In an aspect, a security article has a substrate, a patch of microprinted microimages, a translucent layer laminated to the substrate and the patch, the translucent layer having an array of microlenses in register with said patch of microprinted microimages such that for a plurality of microimages of the array of microimages on the first patch each microimage has a one-to-one correspondence with a microlens in the array of microlenses, wherein when the microimage array is viewed by a viewer through the microlens array, a composite image is visible to a viewer of the security article.

In another aspect, the microimage patch is adhered to the substrate by a first layer of heat- or pressure-activated adhesive.

In another aspect, the microimage patch is adhered to the translucent layer by a second layer of heat- or pressure-activated adhesive.

In another aspect, the patch is formed from a patch material that is transparent and that does not deform significantly due to polycarbonate lamination conditions.

In another aspect, the patch material is polyethylene terephthalate with a thickness of less than 30 microns.

In another aspect, the pitch and skew angle of the microimage array and of the microlens array are essentially the same.

In another aspect, the cohesive force of the microimage patch is less than the adhesive force between the translucent layer containing the microlens array and the patch thereby increasing the chance of separation of the patch from the first translucent layer in the event of a tampering attempt seeking to separate the microimage array and corresponding microlens array from the substrate.

In another aspect, a second heat- or pressure-activated adhesive layer between the patch and the translucent layer.

In another aspect, the adhesive force of the first adhesive layer is greater than the adhesive force of the second adhesive layer thereby increasing the chance of separation of the patch from the first translucent layer in the event of a tampering attempt seeking to separate the microimage array and corresponding microlens array from the substrate.

In another aspect, the security article includes at least one additional translucent layer between the patch and the first translucent layer, wherein one of the at least one additional translucent layer has a cohesive force that is smaller than the cohesive force of the first translucent layer, the substrate, and the patch, thereby increasing the chance of separation of the patch from the first translucent layer in the event of a tampering attempt seeking to separate the microimage array and corresponding microlens array from the substrate.

In another aspect, the microimages comprises microimages printed using UV-curable resin on the patch.

In another aspect, the microimages comprises microimages ablated into a metalized layer of the patch.

BRIEF DESCRIPTION OF THE DRAWINGS

FIG. 5, which consists of FIGS. 5a through 5e, provides cross-sectional drawings of a security document during different stages corresponding to the sequence of FIG. 4.

FIG. 6, which consists of FIGS. 6a through 6f, provides a listing of the steps of FIG. 4 adjacent to the corresponding graphic of FIG. 5.

DETAILED DESCRIPTION OF THE INVENTION

Figure 1:
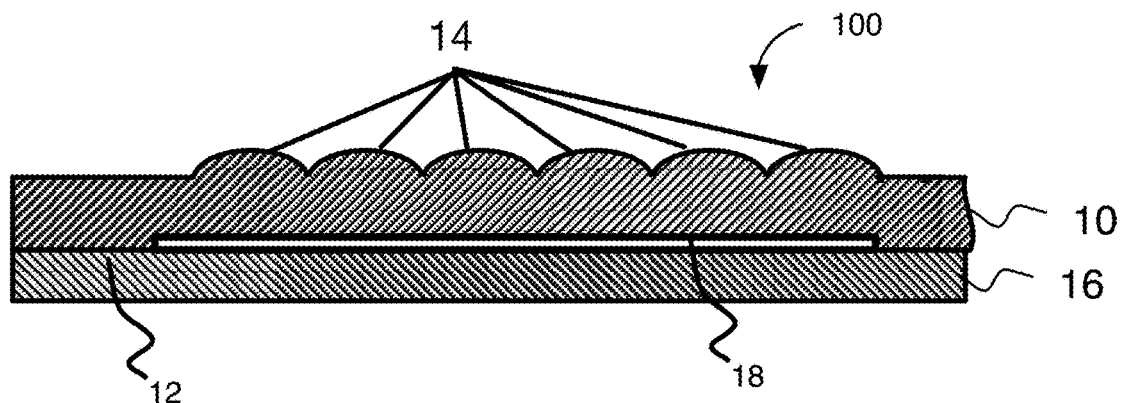
FIG. 1 is an enlarged cross-sectional view of a security article having a microlens sheeting comprising a plano-convex base sheet.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The herein described technology provides a security article including at least one patch having an array of microimages and placed on a substrate of the security article wherein the patch, when viewed through a corresponding microlens array, produces an integrated floating image, e.g., such as composite images described in U.S. Pat. No. 7,336,442 to Dunn et al. (incorporated herein by reference) or other composite images such as those with a moiré effect such as described in U.S. Pat. No. 8,009,360 to Steenblik et al. and U.S. Pat. No. 7,468,842 to Steenblik et al. (both incorporated herein by reference). As the patch may be separately produced using high-definition printing techniques, the resulting composite image may provide a high-level of detail including vibrant colors. Such a high-detail composite image provides a mechanism by which the authenticity of the security document may be verified as it would be exceedingly difficult for a forger to produce an accurate high-detail composite image based on the combination of a patch placed on a substrate and corresponding microlenses, that closely replicates an image thus formed in an authentic security document.

A composite image is an image that is only created by the visual system of an observer when combining an array of microlenses with an array of microimages. If the array of microimages has a repeat pattern with a specific pitch that is typically a specific ratio to the lens pitch or if they have the same pitch but have a particular rotational skew or misalignment, a moiré effect is generated, e.g., the corresponding composite image is a magnification of the individual microimages. On the other hand, if the microimages in the microimage array are each unique with a pitch that matches that of the microlenses, the produced composite image is an integrated image or floating image.

As discussed in greater detail hereinbelow (for example, in conjunction with FIG. 12), the composite image produced by viewing the microimage array through a corresponding microlens array may correspond to an original image, which is used to calculate a microimage file containing the microimage array. Each individual microimage may be a complete representation of the original image. Such microimages are referred to herein as full microimages. On the other hand, the microimages may be a representation of a subset of the original image. Such microimages are referred to herein as partial microimages.

Integrated images, as is described in greater detail hereinbelow, are produced when an array of partial microimages is viewed through a corresponding array of microlenses located on a sheeting of microlenses. In an embodiment, the sheeting of microlenses, a patch containing the array of microimages, and a substrate are laminated to form a structure such that individual microlenses are associated with each microimage of the array of microimages located on the patch. When the microimages on the patch are viewed through the microlens sheeting, the integrated image that is formed in observation appears to be suspended, and can appear to float above, within the plane of, or below the sheeting, or further any combination of perceived levels thereof. The possible suspended integrated images are referred to collectively for convenience as floating images, and they can be located above or below the sheeting (either as two or three-dimensional images) or can be a three-dimensional image that appears above, in the plane of, and below the sheeting. The integrated images can be in black or in grayscale or in color and can appear to move as the viewing angle of the image is changed. Unlike some holographic sheetings, imaged sheeting of the present invention cannot be used to create a replica of itself by capturing the image produced through the microlenses. Additionally, the floating image(s) can be observed by a viewer with the unaided eye.

A moiré effect is produced from overlaying repeating patterns in a substrate. In an embodiment, a moiré base layer is printed on the patch. When the patch, and consequently the moiré base layer, is viewed through the microlens array, a moiré effect is produced.

The microimages or a moiré pattern are printed onto the patch prior to lamination during a manufacturing phase, i.e., before personalization. Thus, the produced images, whether integrated images produced from microimages or a moiré effect, are advantageously used for displaying government seals, company logos, trademarks, or other images associated with the various security documents of many individuals. However, other fields of the security document including portions of the patch may be useful for personalization information, e.g., biographical information of the bearer of the security document.

In one embodiment the microlens array may be used to create additional markings on polycarbonate layers of the security document by laser engraving the polycarbonate layer through the microlens array, e.g., as described in co-pending and co-assigned patent application U.S. Pat. No. 20130154250 to Dunn et al. for "PERSONALIZED SECURITY ARTICLE AND METHODS OF AUTHENTICATING A SECURITY ARTICLE AND VERIFYING A BEARER OF A SECURITY ARTICLE", the entire disclosure of which is hereby incorporated by reference. Such markings may produce laser engraved floating images (LEFI) and may be used to personalize the security document to include personal biometric or biographical information of the bearer of the security document.

Examples of security articles include identification documents and value documents. The term identification documents is broadly defined and is intended to include, but not be limited to, for example, passports, driver's licenses, national ID cards, social security cards, voter registration and/or identification cards, birth certificates, law enforcement ID cards, border crossing cards, security clearance badges, security cards, visas, immigration documentation and cards, gun permits, membership cards, and employee badges. The security articles discussed herein may be an identification document itself or may be a part of the identification document. Other security articles may be described as value documents, and typically include items of value, typically monetary value, such as currency, bank notes, checks, phone cards, stored value cards, debit cards, money orders, credit cards, gift certificates and cards, and stock certificates, where authenticity of the item is important to protect against counterfeiting or fraud.

Some desirable features for security articles discussed in this invention include ready authentication and resistance to simulating, altering, copying, counterfeiting and tampering. Ready authentication can be achieved through the use of indicia that are readily apparent and checked, and yet is difficult to copy or falsify. Examples of such indicia include floating images in sheeting where the image appears to be above, below, or within the plane of the sheeting, or some combination thereof. Such images are difficult to counterfeit, simulate, or copy because the image is not readily reproduced by straightforward methods such as photocopying or photography. Examples of such images include, for example, three-dimensional floating images present in some state driver's licenses where a series of three-dimensional floating images representing the state name or other logo are present across the license card to verify that the card is an official license and not a counterfeit. Such three-dimensional floating images are readily seen and verified.

The sheeting's composite image as described may be used in a variety of applications such as securing tamperproof images in passports, ID badges, event passes, affinity cards, product identification formats, currency, and advertising promotions for verification and authenticity, brand enhancement images which provide a floating or sinking or a floating and sinking image of the brand, identification presentation images in graphics applications such as emblems for police, fire or other emergency vehicles; information presentation images in graphics applications such as kiosks, night signs and automotive dashboard displays; and novelty enhancement through the use of composite images on products such as business cards, hang-tags, art, shoes and bottled products.

As tampering and counterfeiting of identification and value documents increases, there is a need for increased security features. The security feature of the present disclosure provides enhanced security to security articles.

The personalized security article of the present invention having vivid high-definition floating images provides enhanced authentication and verification abilities, as well as enhanced resistance to simulating, altering, copying, counterfeiting or tampering. The security article of this invention also may be created at the point of issuance to the bearer of the security article which enhances security. All of these qualities provide unique security capabilities in a security article.

FIG. 1, which is an enlarged cross-sectional view of a security article, shows a suitable type of microlens sheeting 10 placed or formed on a substrate 16 to form a security document 100. This sheeting 10 comprises a transparent plano-convex or aspheric base sheet 10 having first and second broad faces, the first face having an array of substantially hemi-spheroidal or hemi-aspheroidal microlenses 14 and the second face 12 being substantially planar. The shape of the microlenses and thickness of the base sheet are selected such that the focal plane of the microlens array is approximately at the second face 12. In a preferred embodiment, the microlens sheet is formed from a clear polycarbonate during a lamination phase; as described hereinbelow, for example, in conjunction with FIGS. 4, 5, 6, and 7. In an alternative embodiment, described hereinbelow, for example, in conjunction with FIG. 8, the microlens sheet has pre-formed microlenses and the sheet including these pre-formed microlenses is placed over a patch which is adhered to a substrate. An example of sheeting of this kind with microlenses covering the entire sheet is described in U.S. Pat. No. 5,254,390.

Microlenses with a uniform refractive index of between 1.5 and 3.0 over the visible and infrared wavelengths are most useful for producing integrated images as described herein. Suitable microlens materials will have minimal absorption of visible light, and in embodiments in which an energy source is used to image a radiation-sensitive layer the materials should exhibit minimal absorption of the energy source as well. The refractive power of the microlenses, whether discrete or replicated, and regardless of the material from which they are made, is preferably such that the light incident upon the refracting surface will refract and focus on the opposite side of the microlens. Typically, the light will be focused on a material adjacent to the microlens or on a material located below a transparent intermediate layer or layers.

Microlenses with diameters ranging from 15 micrometers to 275 micrometers are preferable, though other sized microlenses may be used. Good composite image resolution can be obtained in one of two ways: 1) by using microlenses having diameters in the smaller end of the aforementioned range for composite images that are to appear to be spaced apart from the microsphere layer by a relatively short distance, or 2) by using larger microspheres for composite images that are to appear to be spaced apart from the microsphere layer by larger distances. Other microlenses, such as plano-convex, cylindrical, spherical or aspherical microlenses having lenslet dimensions comparable to those indicated above, can be expected to produce similar optical results.

In an embodiment, the microlens layer is placed on a substrate 16. A patch 18 is first placed on the substrate 16. The patch 18 contains an array of partial microimages that form an integrated image when viewed through the microlens layer 10. In an alternative embodiment, the patch 18 contains a moiré repeating pattern that form a moiré effect when viewed through a microlens layer 10.

Figure 2:
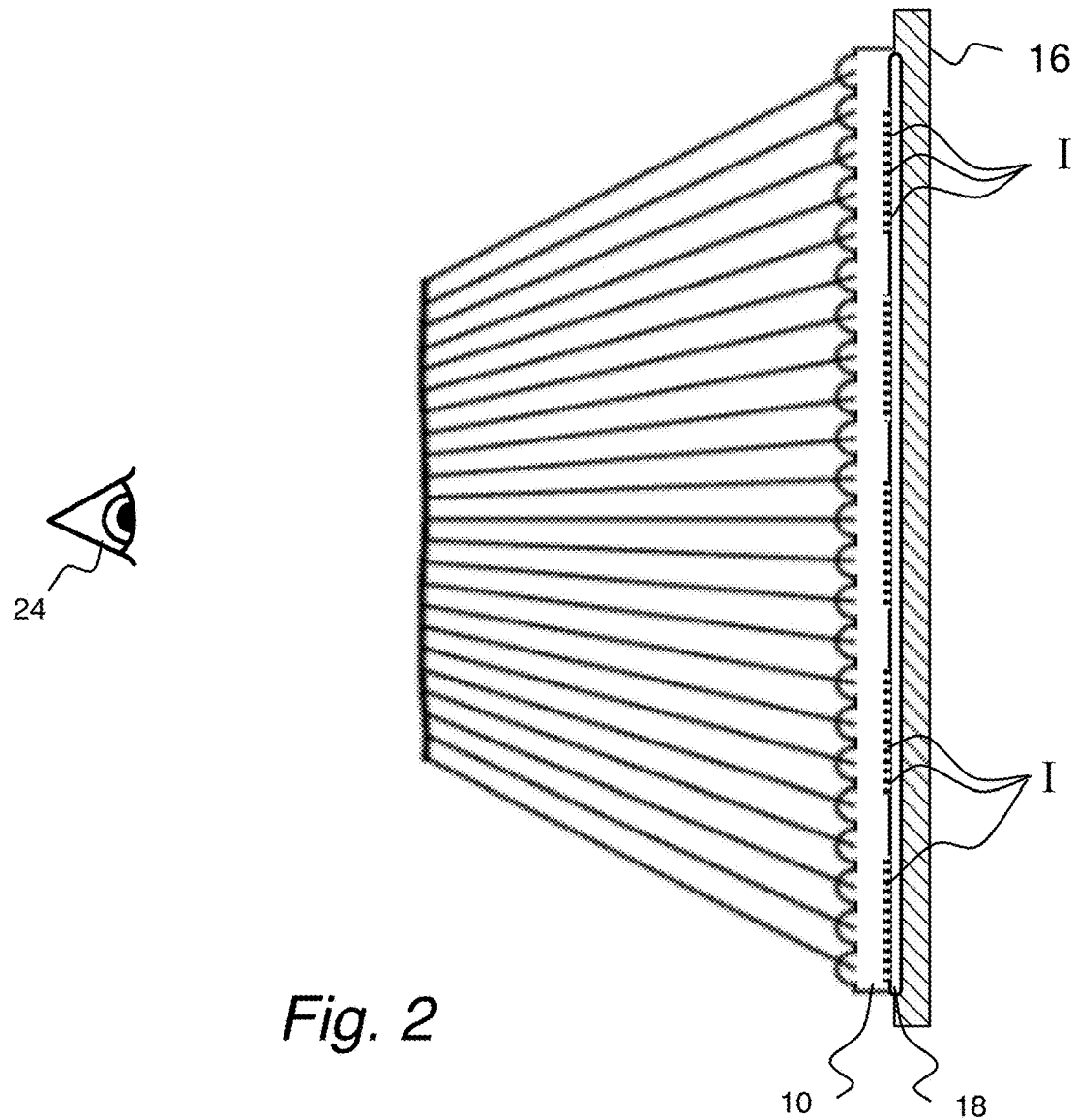
FIG. 2 is a graphical schematic representation of reflected light from microlens sheeting placed over a patch containing microimages.

FIG. 2 is a graphical schematic representation of reflected light from a microlens sheeting 10 placed over a patch 18 containing microimages organized in an array. For integrated images, the microimages on the patch 18 on which an image I is printed are different for each microlens in the microlens layer 10 because each microlens refracts a different perspective to a viewer 24. Thus, each a unique image printed on the patch 18 is associated individually with each microlens by its angle of orientation to each microlens. On the other hand, moiré effects are produced as a result of repeat patterns that are produced when the microimages that are printed on the patch 18 are viewed through the microlens array 10.

Depending upon the size of the original image to be represented in an integrated image, a full or partial image of the original image is present in the microimage of the microimage array of the printed patch behind each microlens. The extent to which each original image is reproduced as an image behind a microlens depends on the relative position of the integrated image to the microlens. For a spatially extended original image, not all portions of the microlens array correspond to all parts of the integrated image. As a result, from those portions of the patch which do not contain a part or whole of the original image, only a partial image of the original image might appear behind the microspheres.

Figure 3A:
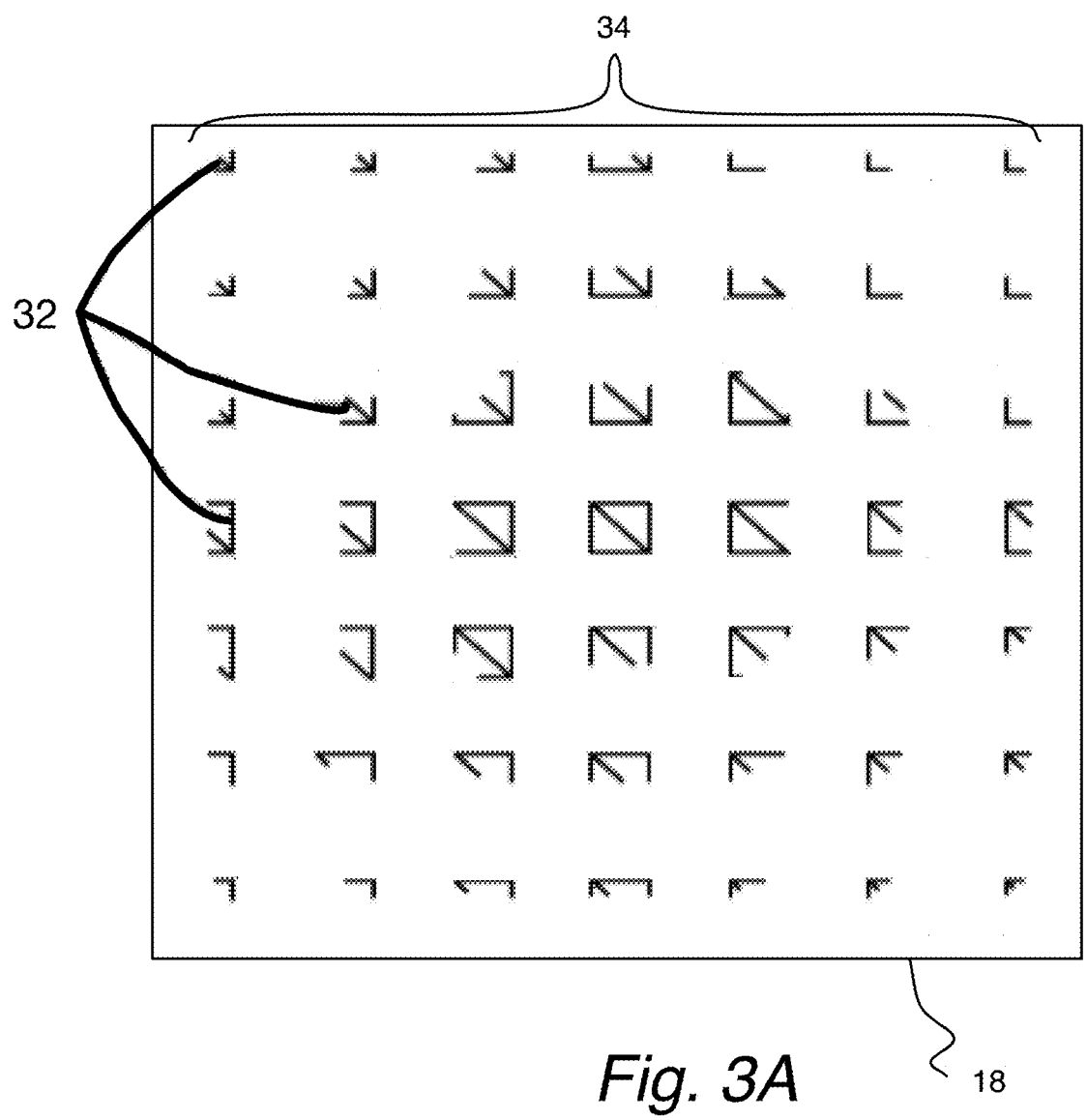
FIG. 3A is a planview of a patch having printed thereon a microimage array consisting of a plurality of sample microimages.

FIG. 3A is planview of a patch 18 having printed thereon a microimage array 34 consisting of a plurality of sample microimages 32.

Figure 3B:
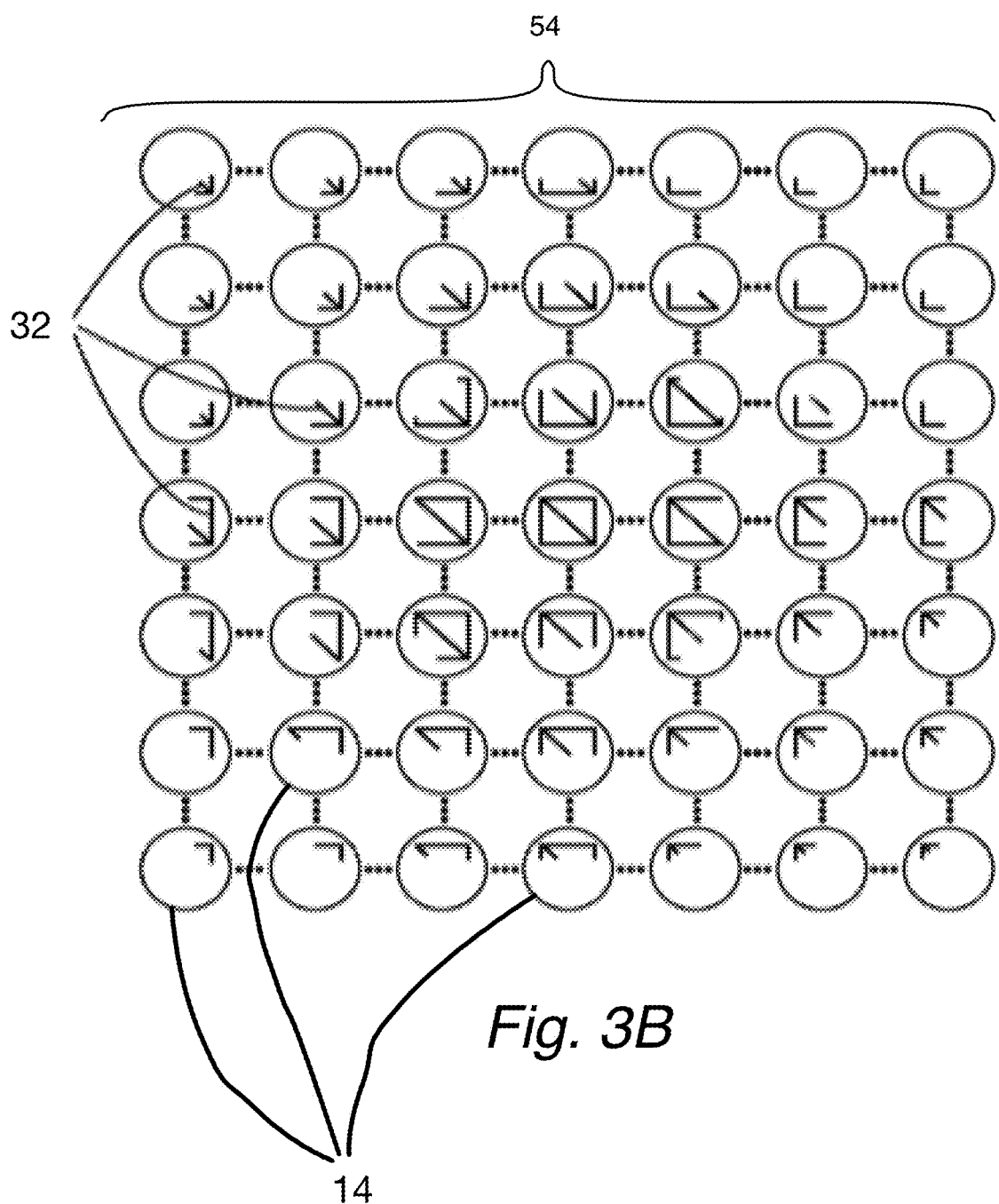
FIG. 3B is a perspective view of a section of a microlens sheeting over the patch depicting sample individual microimages formed on the patch.

FIG. 3B is a perspective view of a section of a microlens sheeting 10 containing a microlens array 54 consisting of a plurality of microlenses 14 placed over the patch 18. FIG. 3B depicts the sample individual microimages 32, which may be partial or full images, and which are located on the patch 18 under individual microlenses 14 as viewed from the microlensed side of the sheeting 10, and further showing that the recorded images range from partial to complete replication of the original image.

Figure 4:
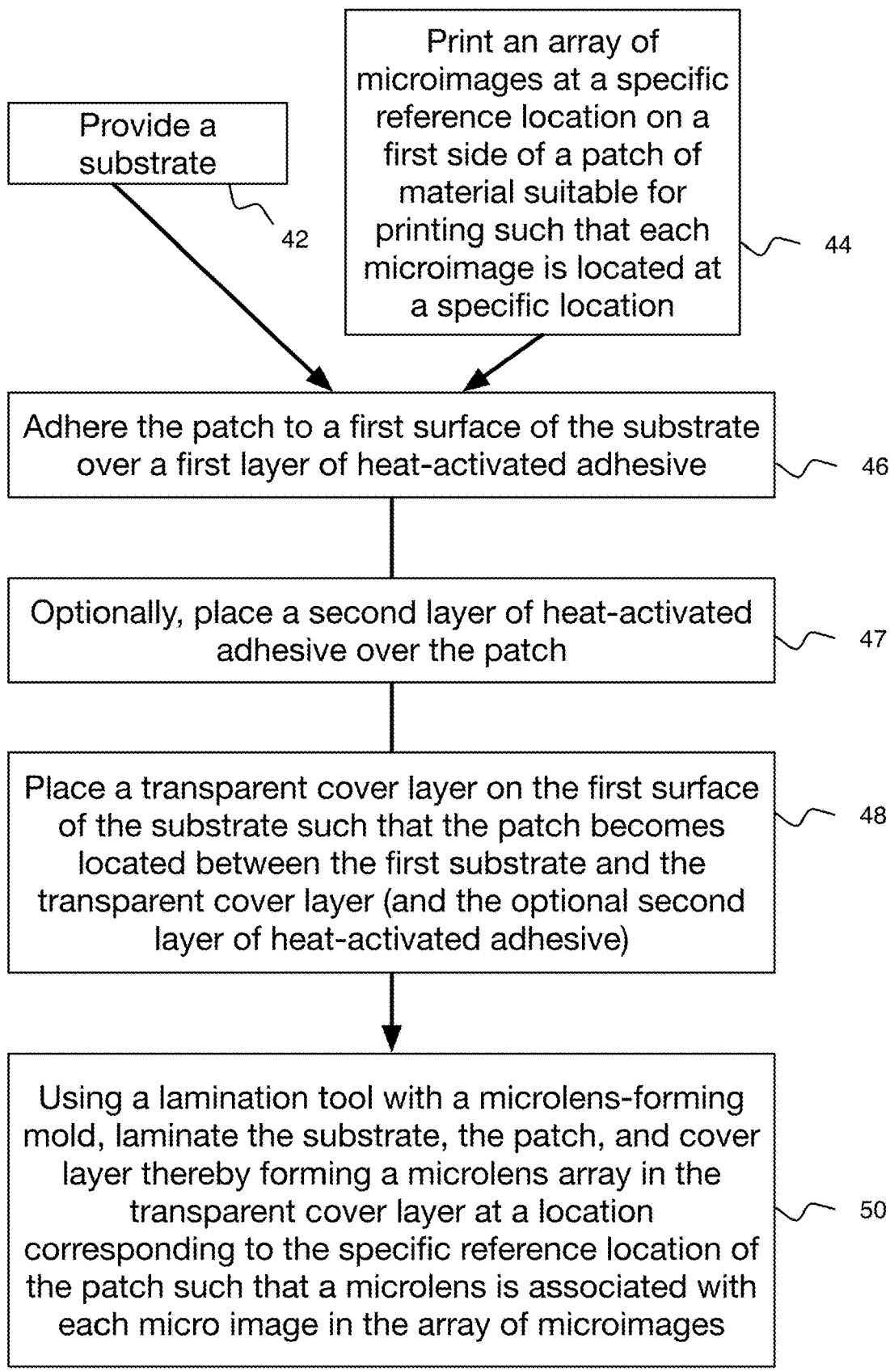
FIG. 4 is a flowchart illustrating the steps to produce a security element in the form of a color floating image on a security document according to an embodiment.

FIG. 4 is a flowchart illustrating the steps in producing a security element in the form of a color floating image on a security document, datapage, or card while leaving the rest of the surface of the document, page, or card free for other elements such as additional security elements and personalization according to one embodiment. FIG. 5, which consists of FIGS. 5a through 5e, provides cross-sectional drawings of the creation of a security feature during different stages corresponding to the sequence of FIG. 4, and FIG. 6 provides a flow-diagram of the steps of FIG. 4 adjacent to the corresponding graphics of FIG. 5.

A first step 42 is to provide a substrate 16. The substrate 16 may be a sheet of polycarbonate, polyester, acrylic, polyvinyl chloride, polypropylene, or similar polymers used in credential production. FIG. 5a shows a substrate 16 in isolation. The substrate 16 may have non-personalized information printed thereon and areas suitable for post-production personalization.

In a second step 44, the patch 18 is printed using a microprinting technology. This microprinting step entails printing an array of microimages at specific reference locations such that each microimage is located at a specific location. As illustrated in FIG. 3B, each microimage 32 is associated with a specific microlens 14. This one-to-one association is achieved by placing the microlens array 34 and the patch 18 such that the pitch (the distance between adjacent microlenses and microimages, respectively) and skew angle with respect to the substrate is accurately controlled for the microimage array 34 on the patch 18 and the microlens array 54. In the case of integrated images, the pitch and skew angle are controlled to be essentially the same for the microimage array and the microlens array. For moiré effects, the pitch and skew are manipulated, as is known to persons skilled in the art, to produce a desired moiré effect, e.g., moiré magnification. Thus, the microimages are located on the patch such that the microlenses can be formed over the microimages or, in an alternative embodiment, a pre-manufactured sheet of microlenses can be accurately placed over the microimages while accurately controlling pitch and skew angle.

In an alternative embodiment, the microimages are printed onto the patch using a UV-curable resin. In yet another alternative embodiment, the patch 18 contains a metalized layer. The printing step, with respect to this embodiment, is performed by ablating the microimages into the metalized layer of the patch.

In an alternative embodiment, the patch 18 is printed with multiple microimages (for example, in different colors) corresponding to each microlens. Each microimage has a corresponding microlens, thus as a whole multiple arrays of microimages are formed. These multiple arrays of microimages can either each generate a unique standing integrated image or allow for switching between different integrated images through tilting or rotating to different viewing angles, thus creating the appearance of a movement in the integrated image. Alternatively, the multiple arrays of microimages may combine into one integrated image. These integrated images can also be thought of as the result of the summing together of many images, both partial and complete, all with different perspectives of a real object. The many unique images are formed through an array of miniature lenses, all of which "see" the object or image from a different vantage point. The microimages can be mathematically determined to generate different perspectives when the integrated image is viewed at different angles.

Behind the individual miniature lenses, the image is created to appear in a certain material layer depending on the shape and location of the image.

In a preferred embodiment, the microimages are less than 3 microns in diameter and may even be of sub-micron diameter in order to correspond to the size and focal length of the microlenses 14. The microlenses 14 typically have focal lengths shorter than the thickness of the security document, which typically is less than 1 mm thick. Therefore, to produce clear integrated images from the combination of microimages 32 on patch 18 and microlenses 14 the printing of the microimages must be performed with high precision.

In one embodiment, the microimages are printed on the patch using ink deposited in a flexographic printing process, a lithographic printing process, or a replicating process such that the pitch of the microimages is controlled so that the pitch of microlenses can be made to conform to the pitch of the microimages. FIG. 5b shows printed microimages 32 on a patch 503.

Alternatively, the microimages are formed by additive or etching processes such as the process used to produce Diffractive Optically Variable Image Devices (DOVIDs).

In a preferred embodiment, the center-to-center distance of the microlenses 14 is approximately 70 μm. Flexographic printing processes with a resolution of 1,000-10,000 dpi provide an adequate resolution for printing microimage 32.

In a preferred embodiment, the patch material is a material that is transparent and that does not deform significantly due to the polycarbonate lamination conditions, i.e., 170-190 degrees Celsius for a duration of 20-40 minutes. In some manufacturing setups, a shorter or longer duration is used. One suitable material is PET (polyethylene terephthalate) with a thickness of less than 30 microns to prevent disruption of the surface of the card and contributing to difficulty in patch removal by counterfeiters.

It should be noted that providing a substrate 16, step 42, and printing a microimage patch 18, step 44, can be performed in any order.

The patch may be further processed to include additional security features, e.g., holograms, secure print patterns, security slits, tamper-revealing, or tamper-destructive technology. For example, a metalized foil or hologram may be placed on the patch and etched with chemicals or by laser to create a contrast with respect to the microimages.

In step 46, illustrated in FIG. 5c, the microprinted patch 18 is made to adhere to the substrate over a layer of adhesive 20. In an embodiment, the adhesive is a heat- or pressure-activated adhesive such as modified polyethylene-based, acrylic-based, polyurethane-based, silicone-based or other known heat- or pressure-activated adhesive systems. The adhesive is preferably transparent, e.g., acrylic-based adhesives used to attach DOVIDs to security articles.

In an alternative embodiment, adhesive is placed on both sides of the microprinted patch 18, step 47, as seen in FIG. 4. In one version of this alternative embodiment, the adhesive strength and cohesive strength of the adhesive layer below the patch 18 is significantly stronger, as much as twice or more, than the adhesive strength and cohesive strength of the adhesive layer above the patch 18. Having greater adhesive and cohesive strength in the adhesive layer below the patch increases the probability that an attempt to separate the layers of the security document 100 would result in a separation at the upper adhesive layer or irreparable harm to the patch. Separation of the security document above the patch or tearing of the patch itself would make reuse of the patch much more difficult.

The patch 18 is placed at a specific location and orientation on the substrate so that the microlens array may be formed or placed above the patch with each microimage 32 associated with a particular microlens 14. "Associated" in this context means that the microimage 32 may be viewed through the corresponding microlens 14.

Figure 8:
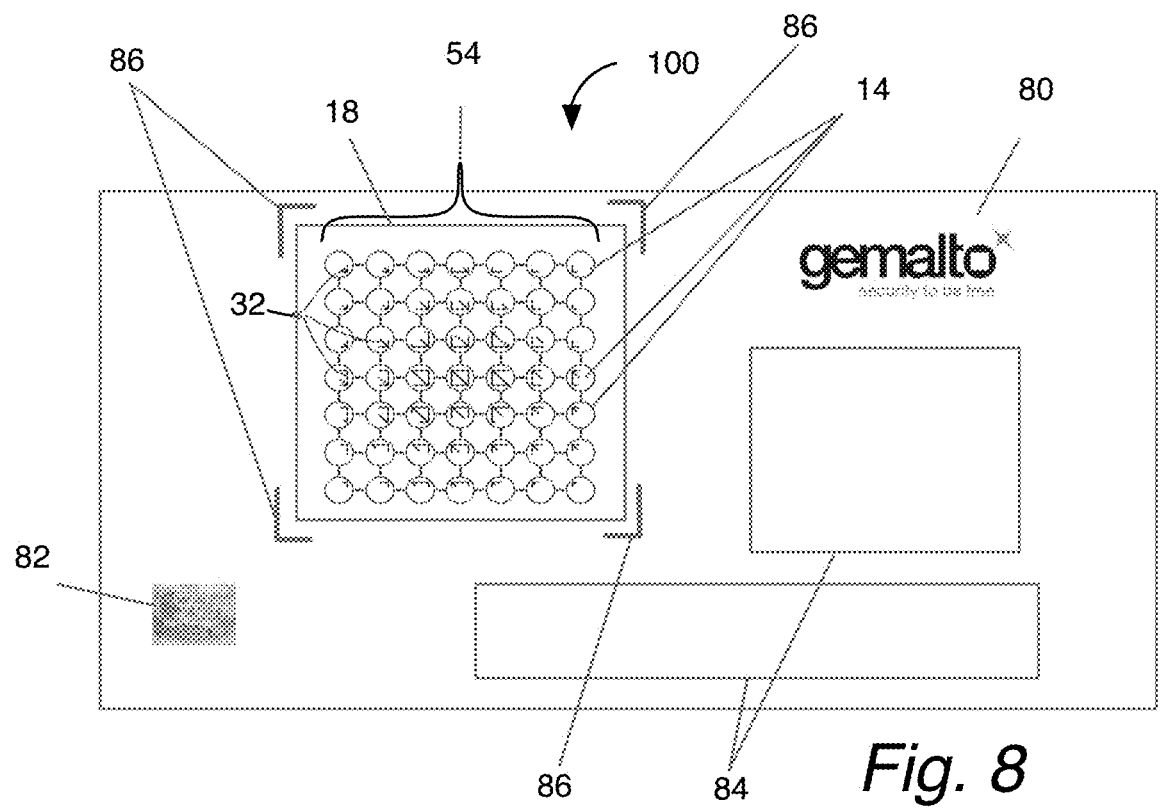
FIG. 8 is a plan view of an illustrative security document having a patch covered by a microlens array.

In an embodiment, the security document 100 contains art work that includes fiducial marks 86 (see FIG. 8). The patch application process includes an optical detection system designed to align the patch to an appropriate distance with respect to the fiducial marks.

In step 48, a transparent cover layer 22 is placed over the surface of the substrate 16 and patch 18. In an embodiment, the transparent cover layer is a layer of transparent polycarbonate with a layer of cured acrylic microlenses on its surface. FIG. 5d provides an illustration of the transparent cover layer 22 placed on top of the substrate 16 and the patch 18.

In an embodiment as shown in 5e, heat and pressure produced by a lamination tool 50 with a microlens-forming mold 52 is used to laminate the substrate 16, the patch 18, and cover layer 22. The tool thereby forms a microlens array 54 in the transparent cover layer 22 at a location corresponding to the specific reference location of the patch such that a microlens 14 is associated with each microimage 32 in the array. As accurate placement of the microlenses over the patch is critical, in an embodiment the lens-forming mold 52 is guided such that the microlenses are formed at a precise skew vis-à-vis the substrate 16 and, consequently, the patch 18. In one embodiment the lens-forming mold 52 is guided using pins. In an alternative embodiment, the lens-forming mold is guided using sheet or plate edge alignment to minimize rotational skew between the patch 18 and the microlens moldes 52.

FIG. 22 is a microphotograph of a portion of the lamination tool 50 used in step 50 of FIG. 6 and illustrated in profile in FIG. 5e, which shows the microlens array mold design.

In an embodiment, the patch 18 is made out of a different material than the material from which the transparent cover layer 22 is made from to prevent perfect adhesion between the layers. For example, in an embodiment, the patch 18 material should have a higher heat deformation temperature than the transparent overlay 22 material. For example, the overlay material (as well as the substrate 16 material) may be polycarbonate. Polycarbonate layers are typically laminated above the glass transition temperature for polycarbonate, namely, above approximately 145° C. Polyethylene terephthalate (PET) is one possible patch 18 material because PET has a much higher melting point, namely, approximately 260° C.

Figure 7:
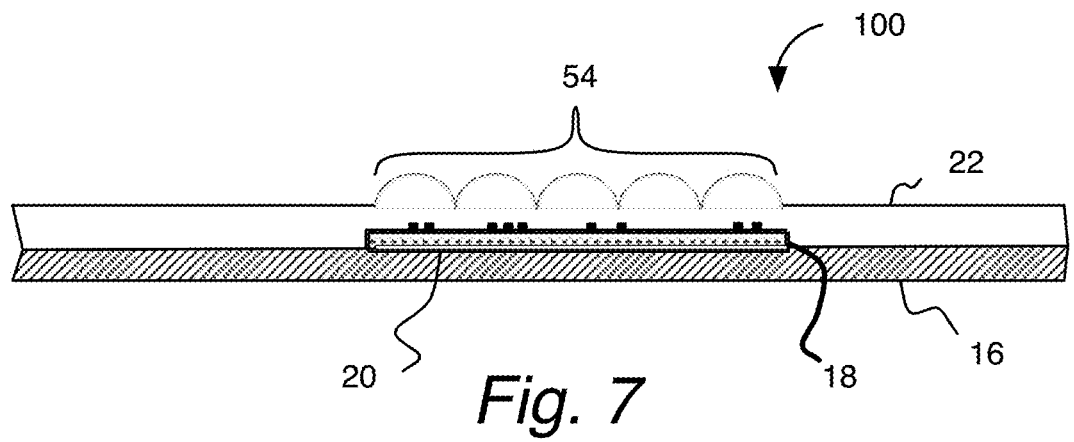
FIG. 7 is a cross-sectional drawing illustrating the post-lamination structure with the patch accurately placed under a microlenses array molded into the transparent cover layer.

FIG. 7 is a cross-sectional drawing illustrating the post-lamination structure of a security article with the patch 18 adhered to the substrate 16 by a heat- or pressure-activated adhesive layer 20 and accurately placed under a microlenses array 54 molded into the transparent cover layer 22.

FIG. 8 is a plan view of an illustrative security document 100 having a patch 18 covered by a microlens array 54 composed of individual microlenses 14. The security document 100 contains areas outside of the microlens array 54 that have non-personalized information, e.g., company logo 80, and security feature 82. The security documents 100 may also contain areas 84 that are available for further personalization. These areas 84 may also be covered with microlens arrays so as to allow for addition of further integrated images during a personalization phase.

Furthermore, the security document 100 may contain fiducial marks 86 that are located by an optical detection system to accurately determine the location for the patch 18 relative to the other features on the security document 100. While corresponding placement of the patch 18 and the microlens array 54 is important, more critical is the accurate match of pitch and that any differences in rotational skew between the microlens array 54 and the microimage array 34 is minimized or entirely avoided. For integrated images, if the skew and pitch between the microimages in the patch 18 and the lenses in the microlens array 54 are not the same, distortion can result in the formed integrated image. Similarly, for moiré effects, if the skew and pitch are not precise, the desired effect would not be achieved. Thus, if there is excessive deviation from the planned rotational skew or more than a few percentage points of pitch deviation, the formed image would not be correct.

Typically, security documents such as security document 100 are manufactured on sheets with multiple documents per sheet. Thus, while in the illustration of FIG. 8, the fiducial marks 86 are illustrated to be located near the microimage patch on the security document 100, in alternative embodiments, the fiducial marks are located outside the perimeter of the security document 100 on material in dead space between instances of security documents.

Figure 9:
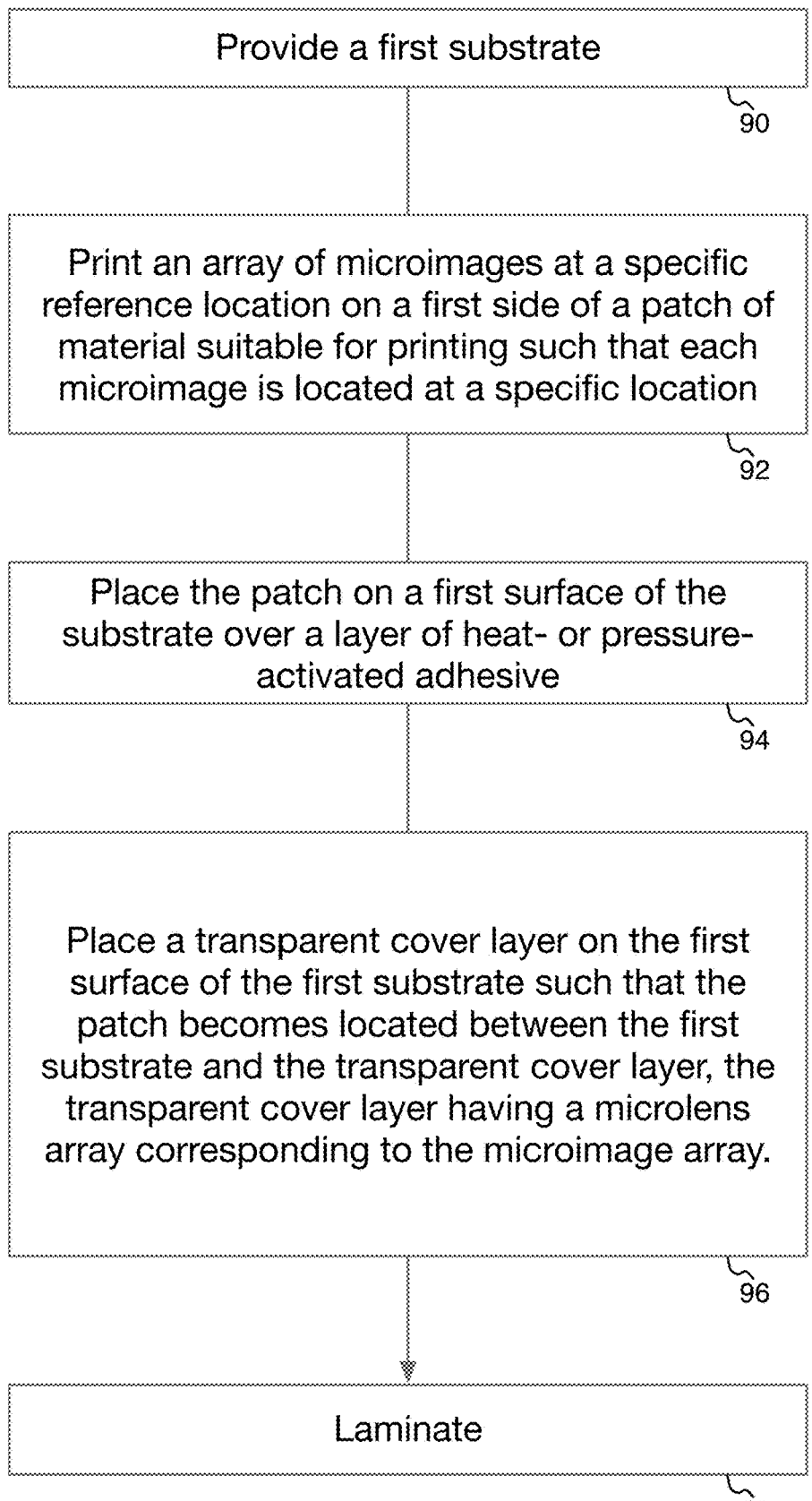
FIG. 9 is a flowchart corresponding to an alternative embodiment wherein the microlens array is pre-formed on a transparent cover sheet and placed on the patch and substrate.

FIG. 9 is a flowchart corresponding to an alternative embodiment wherein the microlens array is pre-formed on a transparent cover sheet and placed on the patch and substrate. The resulting structure of the process of FIG. 9 is illustrated in FIG. 10, which is a cross-section view of a security document 100.

Figure 10:
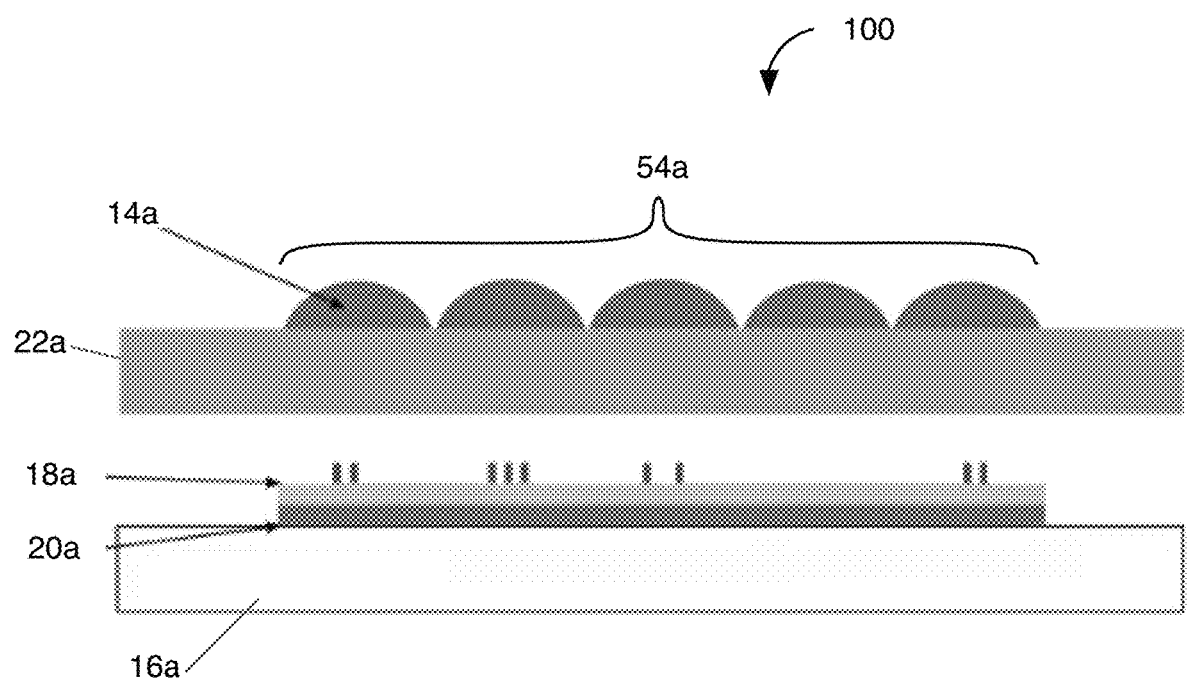
FIG. 10 is a cross section view of a security document corresponding to the process flow of FIG. 9.

As in the embodiment of FIG. 4, in a first step 90, a substrate 16 is provided as is also shown in FIG. 10 as 16a.

Next in step 92, an array of microimages is printed on a patch 18, shown as 18a, and this step 92 corresponds to step 42 of FIG. 4.

Next, in step 94, which corresponds to step 44 of FIG. 4, the patch 18 is placed over a heat- or pressure-activated adhesive on the surface of substrate 16.

In step 96, a transparent cover layer that includes a microlens array at a specific location is placed with a precise registration over the patch 18 and substrate 16 such that each microimage in the patch 18 is associated with a microlens in the microlens array 54a. The microlenses 14a that form the microlens array 54a are pre-formed in the sheeting, via embossing or casting and curing a pre-polymer using a forming tool.

Finally, the structure is laminated, step 98. Plastic sheeting materials may shrink or expand when exposed to elevated temperatures. Therefore, because the lamination is typically performed under elevated heat and pressure, in a preferred embodiment, materials for the substrate 16, patch 18, and microlens sheet overlay are selected to have compatible thermal expansion coefficients, e.g., within 25% of each other. Such matching of expansion is useful to ensure matching of pitch between the microlens microimage arrays.

Referring now to FIG. 10, a printed patch 18a is adhered to a substrate 16a using a heat- or pressure-activated adhesive 20a. A transparent cover layer 22a with preformed microlenses 14a is placed on top of the substrate 16a on the side where the patch 18a is located. After lamination, the structure is the same as or similar to the structure illustrated in FIG. 7.

Figure 11:
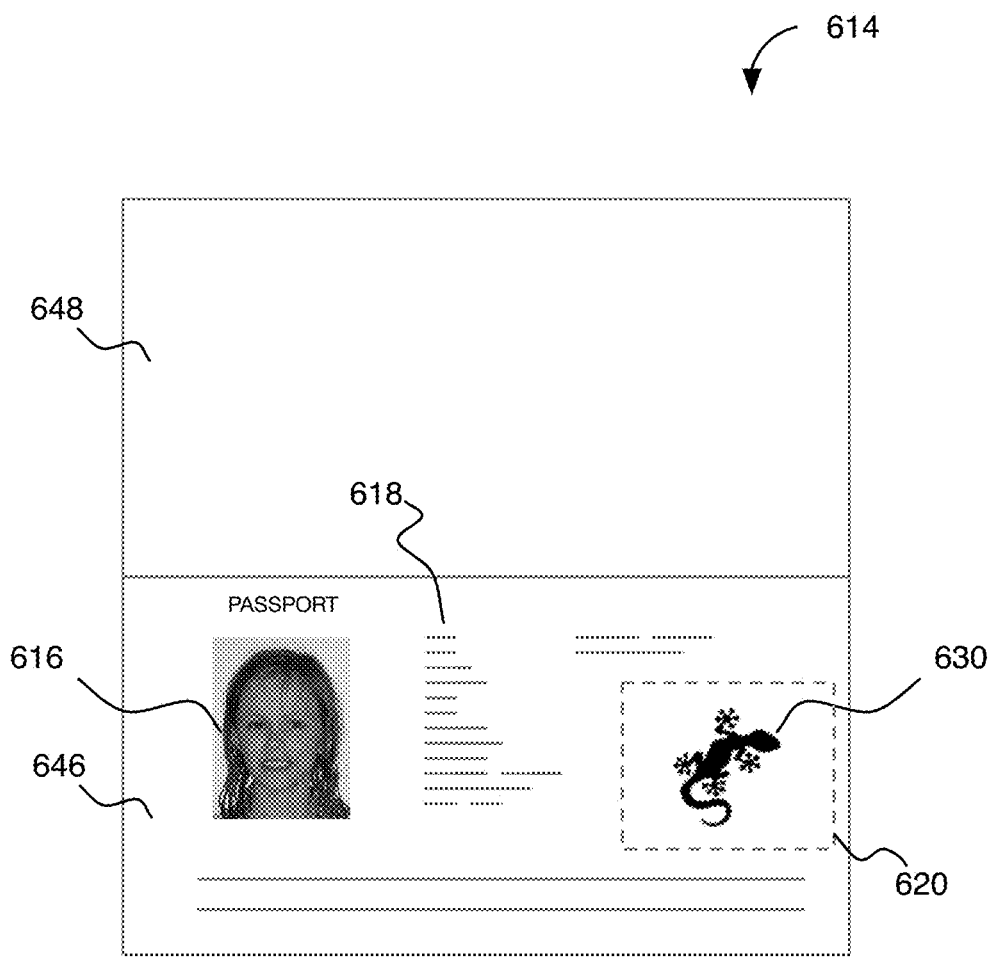
FIG. 11 illustrates one embodiment of a schematic document of value including a floating image.

FIG. 11 is a schematic illustration of one embodiment of a security document, namely, a passport booklet 614 corresponding to security document 100 of the previous figures. The passport 614 is typically a booklet filled with several bound pages. One of the pages usually includes personalized data, often presented as printed indicia or images, which can include biographic data 618, photographs 616, signatures, personal alphanumeric information, and barcodes, and allows human or electronic verification that the person presenting the document for inspection is actually the person to whom the passport 614 is assigned. This same page of the passport may have a variety of covert and overt security features, such as those security features described in U.S. patent application Ser. No. 10/193,850, "Tamper-Indicating Printable Sheet for Securing Documents of Value and Methods of Making the Same," (U.S. Pat. No. 7,648,744) filed on Aug. 6, 2004, and co-owned by the same assignee as the present application. In addition, this same page of the passport 614 includes at least one integrated image 630 (here depicted as a gecko) and formed by an array of microlenses and a corresponding array of microimages, which appear to the unaided eye to float either above, below, or within the plane of the sheeting 620. This feature is a security feature that is used to verify that the passport is an authentic passport and not a fake one.

When the passport 614 has been presented to a customs official by an international traveler, the customs official could look at the passport 614 with his unaided eyes to see if the passport included the appropriate floating image 630 to verify that the passport was authentic.

While the example of authenticating a passport 614 is relied upon for illustrative purposes above in conjunction with the description of FIG. 11, a similar scenario would apply to other instances involving inspection of security documents, such as a security official examining a security document by looking for appropriate floating images or moiré images to verify the authenticity of the security document.

Figure 12:
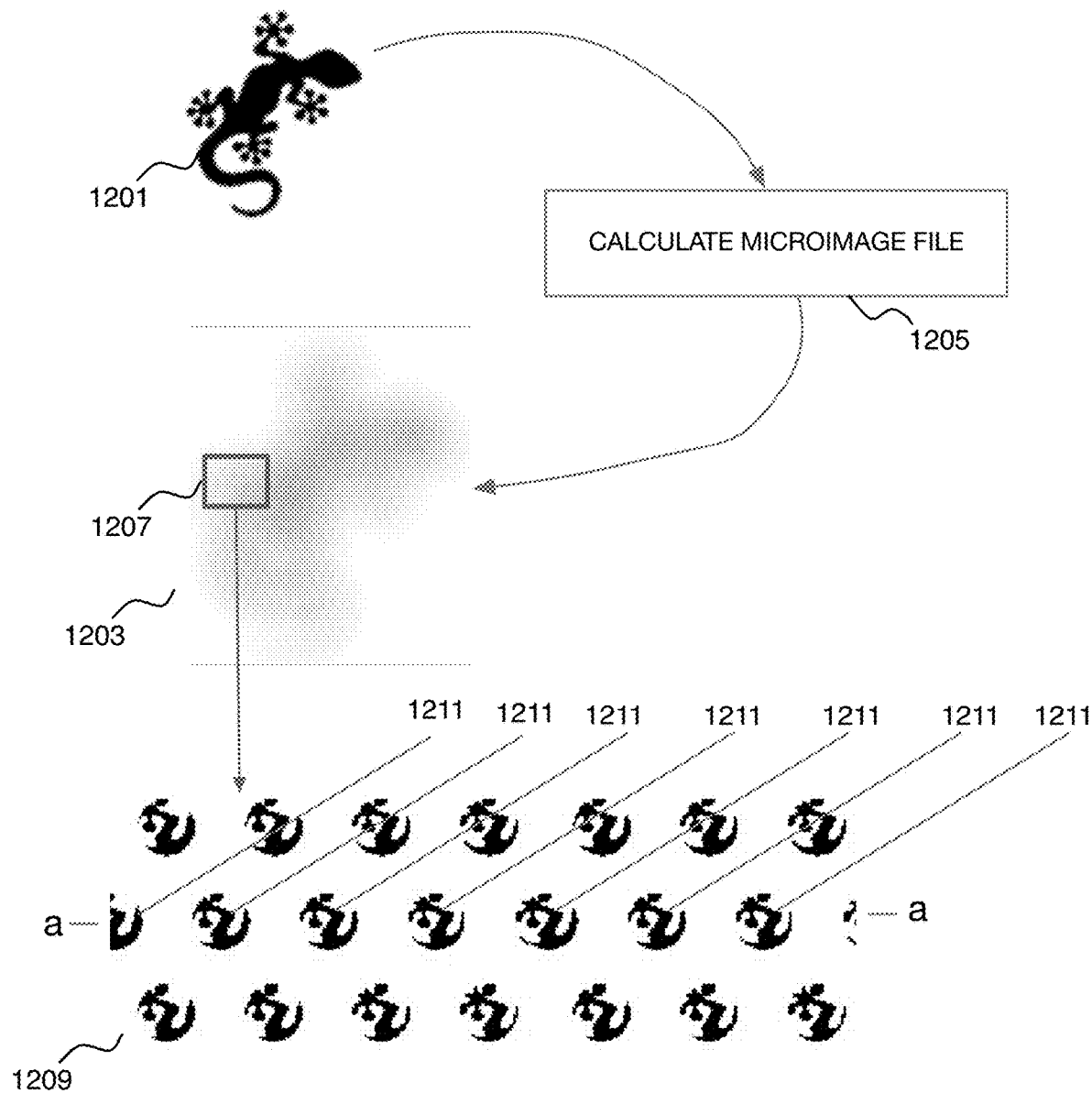
FIG. 12 is a schematic illustrating the relationship between an original image, a microimage file, and individual microimages that make up the microimage file.

FIG. 12 is a schematic illustration of the steps of producing a microimage file 1203 that corresponds to an original image 1201 that is to be presented as a floating integrated image 630 of FIG. 11. A corresponding microimage file 1203 is calculated from the original image 1201, step 1205.

As illustrated, to the unaided eye the collection of microimages in the microimage file 1203 appears as merely a fuzzy image from which the original image is barely discernable. A portion 1207 of the microimage file 1203 including a subset of microimages 1211 of the microimage file 1203 is illustrated in a magnification 1209.

Thus, step 1205 calculates the view of the original image 1201 that is viewable through a corresponding microlens array.

Figure 13:
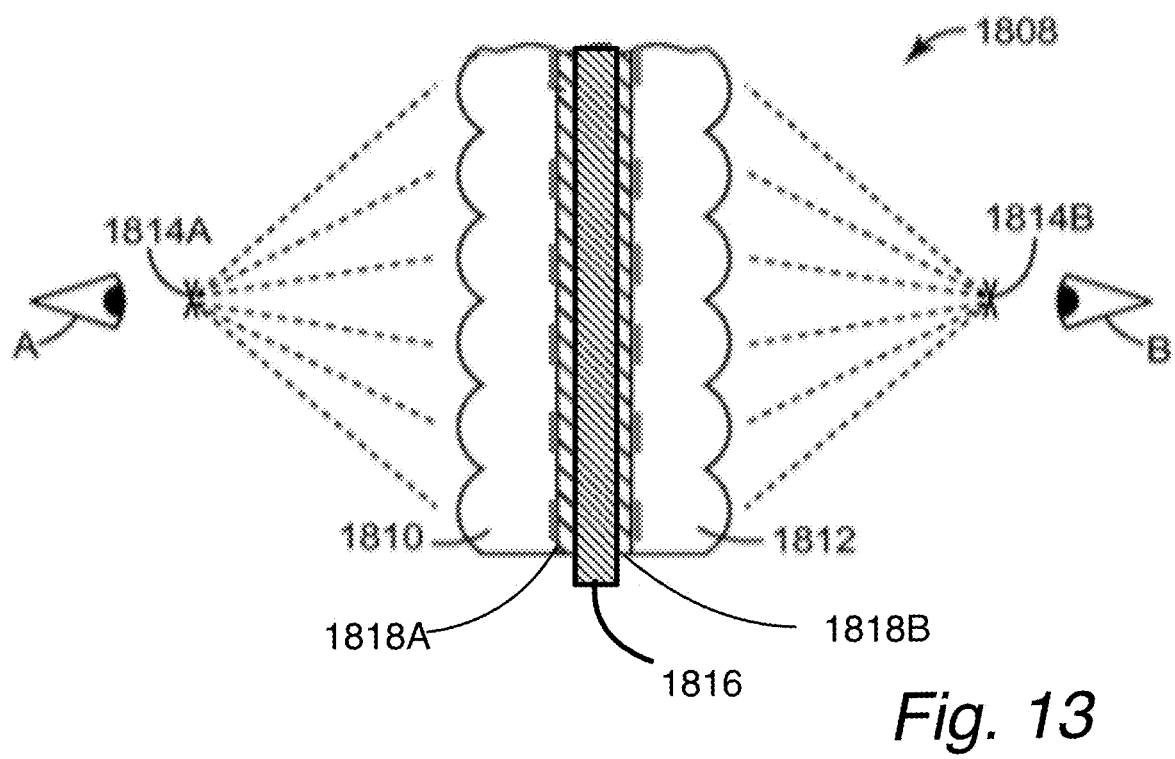
FIG. 13 illustrates an alternative embodiment in which a multi-layer security document has a substrate located between two opposing layers of microlenses formed on the opposing surfaces thereof, and two microprinted patches incorporated between the substrate and the opposing side microlens layers, respectively.

FIG. 13 illustrates an alternative embodiment in which a multi-layer security document 1808 having a substrate 1816, a first layer 1810 that has microlenses formed on a surface thereof, a second layer 1812 similarly having microlenses formed on a surface thereof, a first patch 1818A disposed between substrate 1816 and the first microlens layer 1810, and a second patch 1818B disposed between substrate 1816 and the second microlens layer 1812. The outer surfaces of layers 1810 and 1812 may include an array of substantially hemi-spheroidal or hemi-aspheroidal microlenses. The substrate 1816 may be a transparent material.

The patch 1818A presents an integrated image 1814A and the second patch presents a second integrated image 1814B ("integrated images 1814"). Integrated images 1814 appear to an observer A on one side of security document 1808 and an observer B on the opposing side of the security document 1808, respectively, to float above, below, or within the security document 1808 when viewed under reflected light. The integrated images 1814 are produced by the sum of individual microimages printed on the patch 1818A and 1818B, respectively, when viewed through microlenses 1810 and 1812, respectively, as described above. In one embodiment, layers 1810, 1812, as well as patches 1818, may be attached to the substrate 1816 by lamination. The security document 1808 may comprise additional coatings, films, or other types of layers. For example, the substrate 1816 may contain a metallic spacer, a dielectric spacer, a corner-cube spacer, a diffraction grating spacer, a multilayer optical film (MOF), or a compound optical spacer. Similarly, multiple layers of material of different kinds or colors may be provided to collectively form the microlens sheeting layers 1810 and 1812. In some embodiments, different images may be formed on the patches 1818A and 1818B, and as a result, different floating images may be visible to observers A and B. Alternatively, the images formed by patches 1818A and 1818B are the same such that the same floating images are visible regardless of which side from which the security document is viewed.

Figure 14:
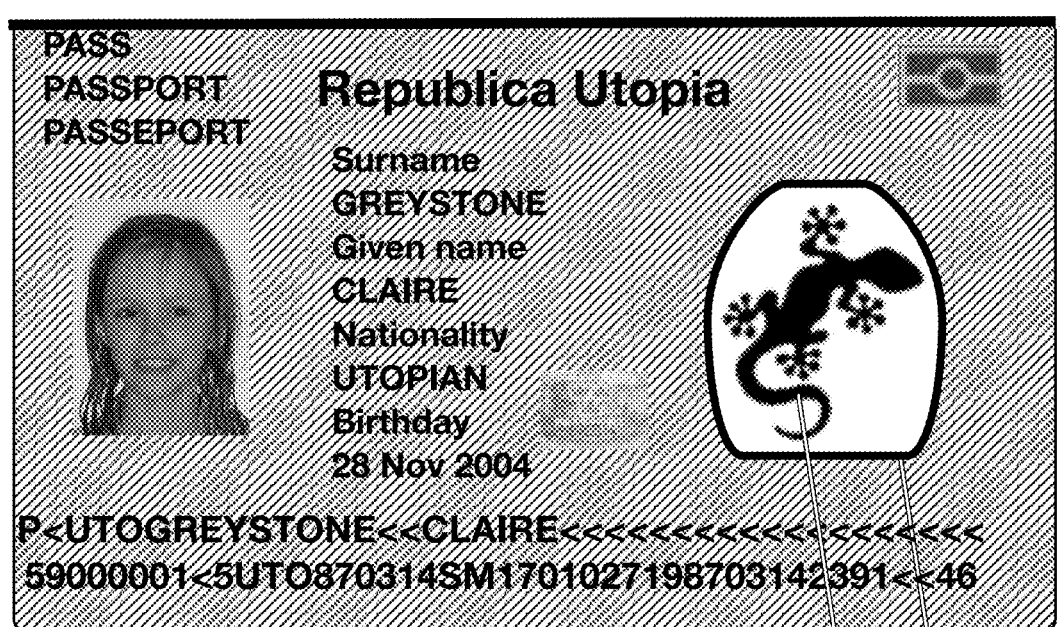
FIG. 14 is a schematic of a security document having a transparent window containing a microimage patch and microlens array for producing an integrated image.
Figure 15:
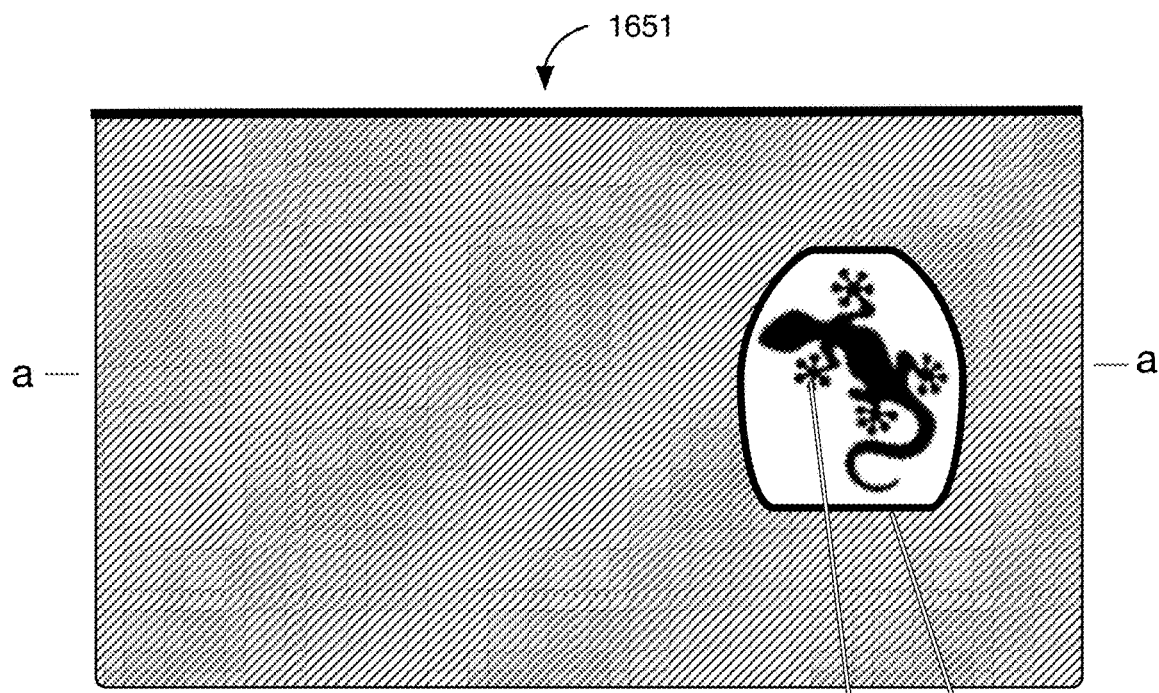
FIG. 15 is a schematic of the backside of the security document of FIG. 14.

FIG. 14 is a schematic of an alternative embodiment in which a security document 1651 contains a transparent window 1653 in which an integrated image appears from either side of the document. FIG. 14 provides a front-side view of the security document 1651 and FIG. 15 provides a schematic of the corresponding back-side view of the security document 1651. In the example of FIG. 14, in the front-side view of security document 1651, an integrated image 1655 of a gecko appears to the viewer of the document whereas in the back-side view of FIG. 15 a mirror image of the integrated image 1657 of the gecko appears to the viewer.

Figure 16:
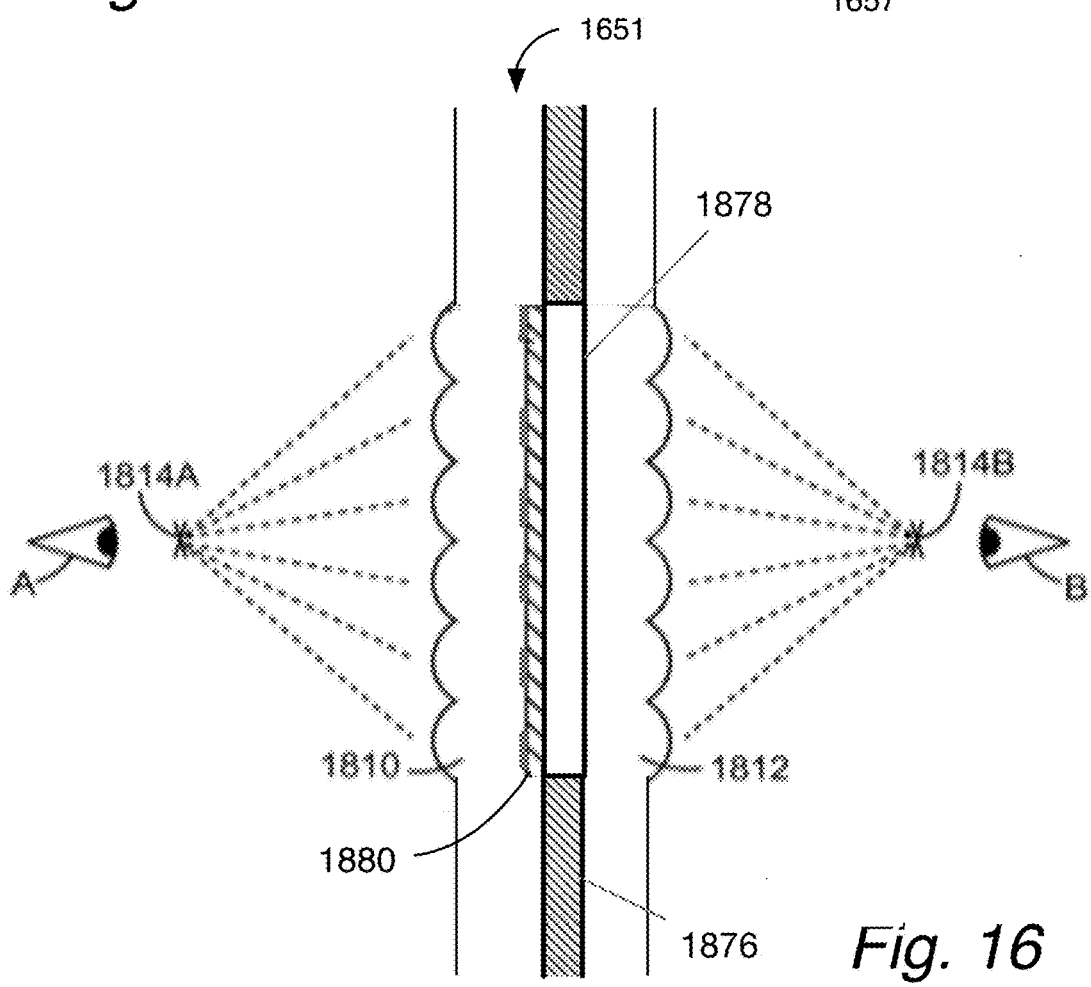
FIG. 16 is a cross-section view of the security document of FIG. 14.

FIG. 16 is a cross section view of the security document 1651 of FIGS. 14 and 15 along the line a-a. Unlike the embodiment of FIG. 13, the substrate 1876, which corresponds to the substrate 1816 of the embodiment of FIG. 13, contains a see-through portion 1878 on which patch 1880 is attached as discussed hereinabove. The patch 1880 is also transparent. Thus, the printed material, e.g., an image array 34 is visible through the lens arrays 1810 and 1812. The focal length of the lenses in the lens arrays 1810 and 1812 is adjusted so as to allow formation of integrated images from both sides of the security document 1651.

In an alternative embodiment, not shown, a second patch is located on the b-side of the security document 1651. The focal length of the lens array 1812 is then adjusted to focus on an image array printed onto that second patch. Thus, in this alternative embodiment, two different integrated images appear when the document is viewed from the vantage point A versus vantage point B.

Figure 17:
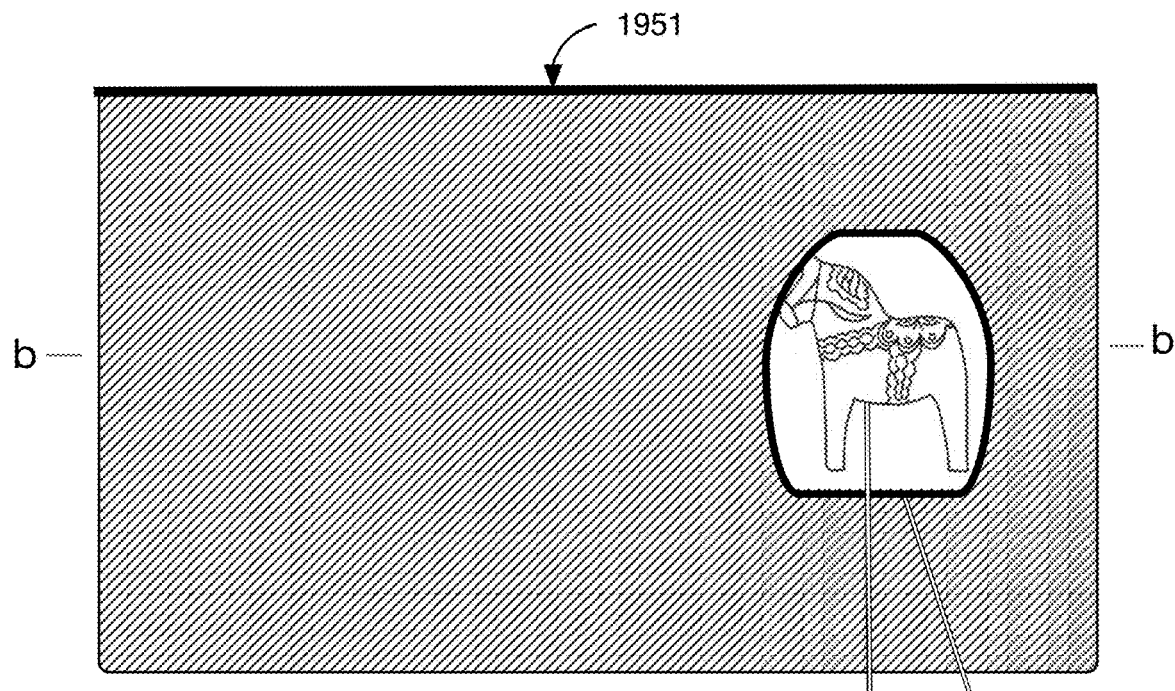
FIG. 17 is an alternative backside view in which a different integrated image is visible from the backside.
Figure 19:
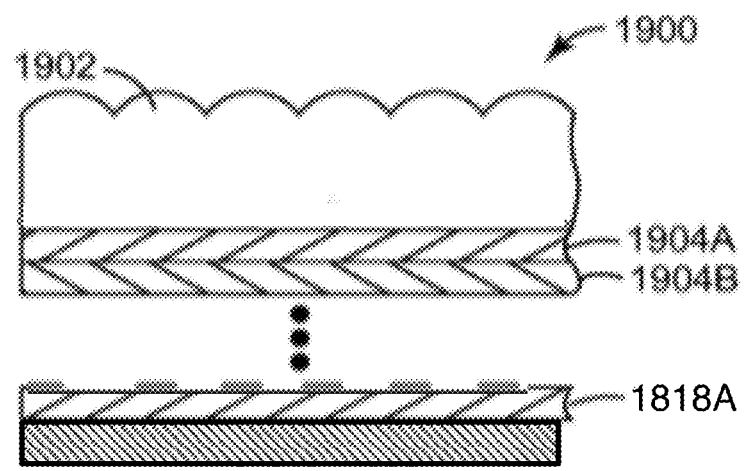
FIG. 19 is an enlarged cross-sectional view of a security document including a layer having microlenses formed on a surface thereof and a plurality of additional translucent layers.
Figure 20:
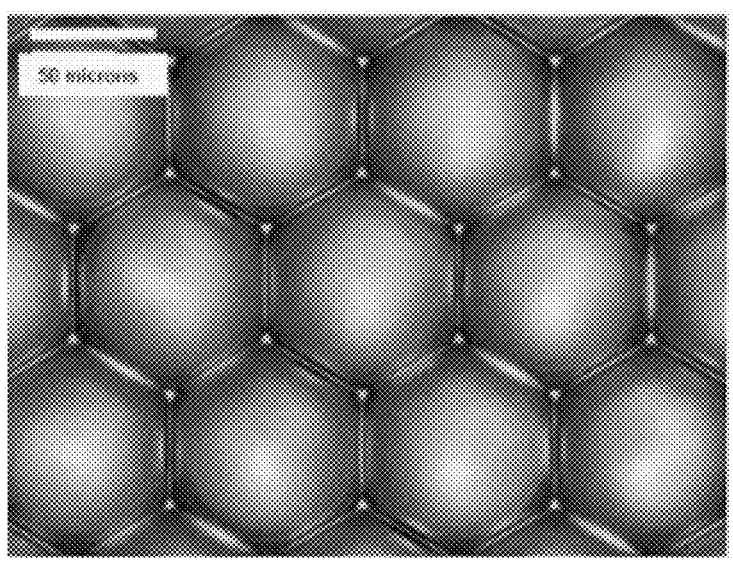
FIG. 20 is a microphotograph of a portion of a lamination tool for making a microlens array as part of the lamination process of a security device.

FIGS. 17 and 19 illustrate an alternative embodiment to the embodiment illustrated in FIGS. 14-16. In this alternative embodiment, a security document 1951 produces different integrated images depending on the side from which the security document 1951 is viewed. The front side may be much like FIG. 14, with security document 1951 corresponding to security document 1651, and is therefore not separately illustrated herein. However, FIG. 17 depicts the back-side view, in which a different composite image 1957 is produced in the see-through window 1953, which corresponds to the see-through window 1653.

Figure 18:
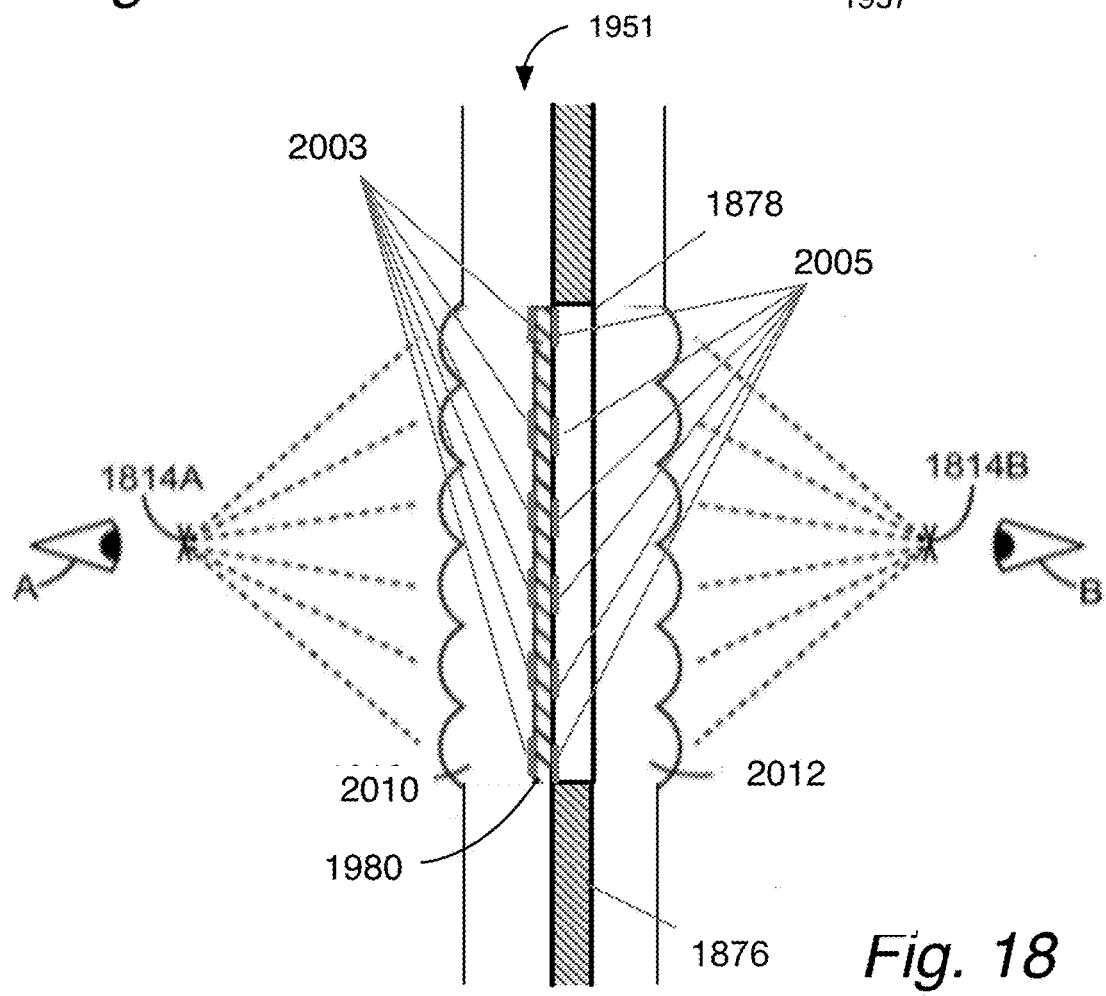
FIG. 18 is a cross-section view of the security document of FIG. 17 in which different integrated images are visible from the front and back of the security document, respectively.

FIG. 18, which is a cross-section view corresponding to the line b-b of FIG. 17, a patch 1980 contains a first microimage array 2003 on a first side and a second microimage array 2005 on a second side, both respectively corresponding to front and back views of the security document 1951. The microimage arrays 2003 and 2005 have corresponding microlens arrays 2010 and 2012. The focal length of the microlens array 2010 is made to match the microimage array 2003 thereby producing a first floating integrated image 1814A and the focal length of the microlens array 2012 is made to match the microimage array 2005 thereby producing a second floating integrated image 1814B. By thus matching the focal length between each microlens array to its corresponding microimage array, a viewer seeing image 1814A could not see the focused image 1814B designed to be seen from the opposing side, and conversely a viewer seeing image 1814B could not see the focused image 1814A, therefore only one of the microlens arrays is clearly visible from each side of the security document 1951. However, as discussed herein above, each of the microimage arrays may include multiple images that are viewable from different view anglesw.

FIG. 19 is an enlarged cross-sectional view of a security document 1900 including a layer 1902 having microlenses formed in a surface thereof and a plurality of additional translucent layers 1904A-1904N ("translucent layers 1904"). The microlens layer 1902 may be substantially similar to layer 22 of FIG. 7. That is, as described above, the layer 1902 may constitute a single layer of sufficient thickness so that individual microimages may be formed on a patch located immediately below the microlens layer 1902. Alternatively, additional translucent layers 1904 may be added between the microlens layer 1902 and the patch layer 1818a to produce added visual appearance (e.g., different colors, color contrast, color-shift) and function. Translucent layers 1904 may be layers having optical structures, e.g., lenses, corner cubes, lenticular lens arrays, positioned within the optical stack to add effects such as color shifting and function. For example, a diffractive grating may add color shifting effects, while lenses may provide imaging functionality. The microlens sheeting 1902 in combination with the translucent layers 1904 may be used to provide a high contrast white floating image on a continuously variable color background. The individual images formed in the material, when viewed by an observer under reflected or transmitted light, provide a composite image that appears to be suspended, or float, above, in the plane of, and/or below the sheeting.

In one embodiment, at least one of the intermediate translucent layers 1904 is constructed to be mechanically weaker than the other layers of the security document 1900, including the microlens layer 1902 and the patch layer 1818a. By purposefully having one of the intermediate layers 1904 being weaker than the other layers, an attempt to disassemble the lamination for the purpose of moving the patch 1818 to another document would be more difficult in that the security document 1900 is more likely to tear at the weaker layer.

As discussed above, a number of configurations are possible for translucent microlens sheeting. For example, the sheeting may include a spacer that results in images misaligned with respect to the lens array. This may produce movement of the image orthogonal to the movement of the observer relative to the substrate. As another example, a single layer of microlenses may be formed from energy-absorption-appropriate materials. A protective topcoat may be added to a sheeting to add durability. Such a topcoat may be colored or transparent and may enhance image appearance and provide a mechanism with which to produce a uniform background color. The layer having microlenses on a surface or the additional translucent layers may be dyed or pigmented with customized colors.

Figure 21:
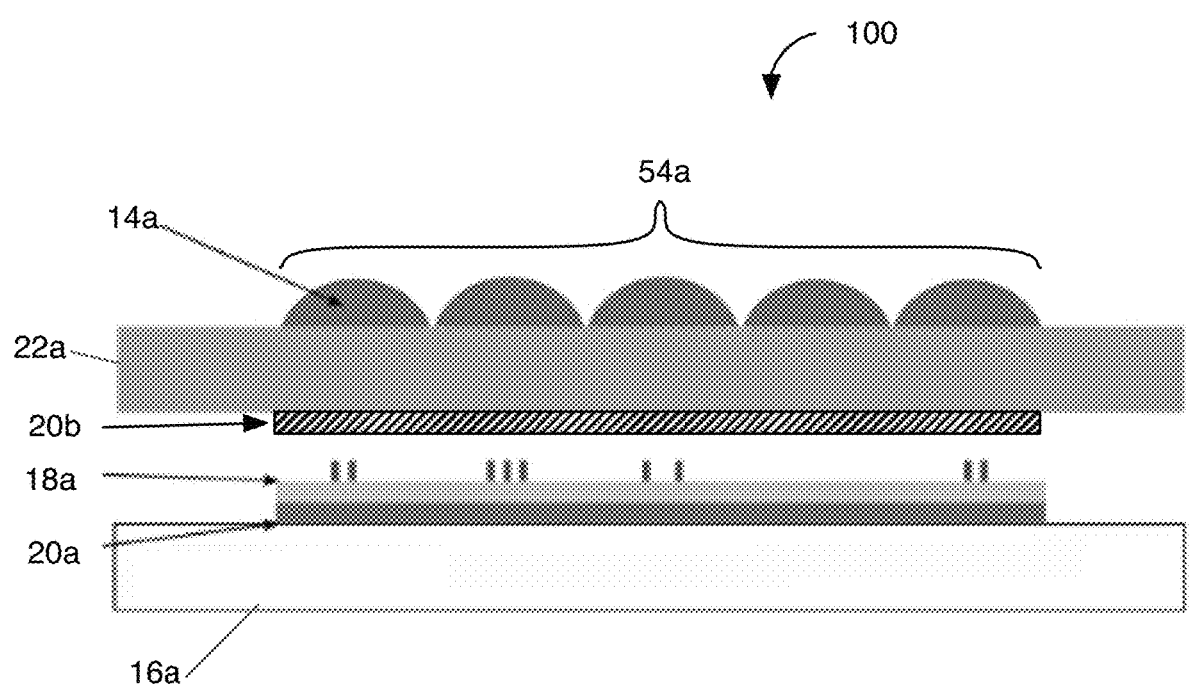
FIG. 21 is a cross-section view of a security document having a layer of heat- or pressure-activated adhesive between a microimage patch and a translucent layer having a microlens array.

Adhesive layers are typically very thin compared to the patch, substrate, and microlens-sheeting layers. Therefore, the adhesive layers are not explicitly depicted in the all of the figures described herein. Furthermore, in alternative embodiments there may be additional or alternative adhesive layers. For example, in one alternative embodiment, e.g., as illustrated in FIG. 21, a heat- or pressure-activated adhesive layer 20b is placed between the patch 18 and the microlens-sheeting layer 22. This heat- or pressure-activated adhesive layer may be either in lieu of or in addition to the adhesive layer 20a.

Example I

A 5 cm×5 cm patch of 50 micron PET was printed with black microimages by microreplicating UV-curable black ink onto the PET surface followed by curing with a UV lamp to fix the ink. The pitch of the images was ~70 microns. Optically clear acrylic adhesive 3M F9460PC from 3M Corporation, Minneapolis, Minn., USA, was adhered to the back side of the patch and this adhesive-laden patch was adhered to the middle of a 10 cm×10 cm sheet of 100 micron white Makrofol® thermoplastic polycarbonate film from Covestro AG, Leverkusen, Germany. A 10 cm×10 cm sheet of 100 micron clear Makrofol polycarbonate was placed in alignment with a white PC sheet to form a lamination sandwich. This lamination sandwich was placed between a smooth, featureless stainless steel sheet and a nickel tool such that the white PC was facing the steel sheet and the clear PC was facing the nickel tool. The nickel tool included depressions engraved in the tooling where the depressions were the inverse of microlenses with a focal length identical to that of the black microimages on the PET patch. PC microlenses formed by this tooling result in a focal length of approximately 100 microns. The tooling was aligned to the printed PET patch by the use of fiducial marks on the printed PET that aligned with fiducial marks on the nickel tooling, and this alignment was maintained by the use of two pins on the steel sheet that fed through corresponding holes in the nickel tool. On the outside of both the stainless steel sheet and nickel tool were 400 micron lamination pads followed by another stainless steel sheet to construct a lamination stack. The lamination stack was placed inside a heated lamination press (350 F) from Carver, Inc., Wabash, Ind., USA, and allowed to sit for 30 seconds before the press was closed with a force of 3000 pounds. After 15 minutes, the lamination press was set to "cool" and lab water was flooded into the platens so that the press cooled to room temperature in approximately 10 minutes, after which the press was opened, and the lamination stack was removed. The lamination sandwich was removed from the metal sheets with fully formed microlenses on the surface that had faced the depressions on the nickel tool. The clear PC and white PC sheets outside the PET patch were thoroughly bonded together as the temperatures and pressures used during lamination enabled the PC chains to soften and intermingle, fusing after cooling. Because the microlenses were in alignment with the printed PET, and the focal length was correct, the desired integrated image was formed. As the adhesion between the clear PC sheet and the printed PET was less strong than the adhesion between the PET and the white PC, any attempt to remove this floating image feature from the laminated sandwich would result in a separation of the microlenses from the microprint, causing the integrated image to be lost.

The single and multi-layer sheeting using translucent layers, as described above, may be used in a number of applications, including those as varied as security documents and consumer decorative applications, and this method is a particularly useful improvement to polycarbonate security credentials. For example, the floating image of the sheeting may be used for a floating watermark as a translucent overlay, providing a secure feature through which printed information is visible. The sheeting may be made very thin (<1 mm), which may enable integration of the sheeting into security documents, passports, drivers licenses, currency, banknotes, identification cards, titles, personnel badges, proofs of purchase, authenticity certificates, corporate cards, financial transaction cards (e.g. credit cards), certificates, brand and asset protection labels, registration tags, tax stamps, gaming chips, license plates, validation stickers, or other items.

The sheeting may also be incorporated into materials used by creative designers for products as diverse as computer cases, keyboards, numeric key pads, or computer displays.

There are myriad possible combinations of microimage rendering vis-à-vis the background. For example, microimages may be dark images on a light background, light images on a dark background, or the microimages may be in a first color printed against a background in a second color.

A technology is described hereinabove that provides an efficient tamper-resistant mechanism for creating vivid colorful floating images in security documents by adhering a microprinted patch of microimages that may be viewed through a microlens array to thereby produce an integrated image that may appear to float above, below, or within the security document and which is likely to reveal attempts at tampering by failing to produce expected floating images or moiré effects. Microprinting an array of microimages with high precision on a patch and placing that patch with high precision adjacent to a microlens array would be difficult for a forger to master. Furthermore, attempts to disassemble the laminate of the security document is likely to fail because of tearing of the patch or layers between the patch and the microlens array. Thus, the herein described technology provides a security feature to security articles that is very valuable as a countermeasure against production of fraudulent security articles.

Although specific embodiments of the invention have been described and illustrated, the invention is not to be limited to the specific forms or arrangements of parts so described and illustrated. The invention is limited only by the claims.

The invention claimed is:

1. A method for producing a security article having a substrate, the method comprising:
   microprinting a microimage array on a patch;
   placing a first translucent layer over the substrate and the patch; and
   laminating the substrate, the patch, and the first translucent layer using a lamination tool such that after the laminating step a microlens array is located in the first translucent layer in register with the patch such that pitch and skew angle of the the microimage array and pitch and skew angle of the microlens array are essentially equal, thereby, for each microimage of a plurality of microimages on the microimage array, a microlens in the microlens array is located above a single microimage;
   wherein when the microimage array is viewed by a viewer through the microlens array, a composite image is visible to a viewer of the security article.

2. The method of claim 1, further comprising:
   adhering the microprinted patch on a first section of the substrate over a first heat- or pressure-activated adhesive layer, or
   adhering the microprinted first patch to a first section of the translucent layer under a first heat- or pressure-activated adhesive layer.

3. The method of claim 1, wherein the lamination tool includes an array of recesses located such that the lamination produces the microlens array in the first translucent layer in register with the patch.

4. The method of claim 1, wherein the first translucent layer contains a microlens array and the laminating step includes placing the microlens array of the first translucent layer in register with the patch.

5. The method of claim 1 wherein the skew angle of the microimage array with respect to the substrate and the skew angle of the microlens array with respect to the substrate are within three degrees.

6. The method of claim 1 wherein the pitch of the microimage array and the pitch of the microlens array are within three percent of each other.

7. The method of claim 1 comprising placing a first heat- or pressure-activated adhesive layer between the substrate and the patch and placing a second heat- or pressure-activated adhesive layer between the substrate and the first translucent layer and opposite to the first heat- or pressure-activated adhesive layer with respect to the patch.

8. The method of claim 7 wherein adhesive force of the first adhesive layer is greater than adhesive force of the second adhesive layer thereby increasing probability of separation of the patch from the first translucent layer due to a tampering attempt seeking to separate the microimage array and corresponding microlens array from the substrate.

9. The method of claim 1 wherein cohesive force of the patch is less than adhesive force between the translucent layer containing the microlens array and the patch thereby increasing probability of separation of the patch from the first translucent layer due to a tampering attempt seeking to separate the microimage array and corresponding microlens array from the substrate.

10. The method of claim 1 further comprising
    placing at least one additional translucent layer between the patch and the first translucent layer, wherein one of the at least one additional translucent layer has a cohesive force that is smaller than cohesive force of the first translucent layer, the substrate, and the patch, thereby increasing probability of separation of the patch from the first translucent layer due to a tampering attempt seeking to separate the microimage array and corresponding microlens array from the substrate.

11. The method of claim 1 wherein the step of microprinting the microimages comprises printing UV-curable resin on the patch.

12. The method of claim 1 wherein the step of microprinting the microimages comprises ablating the microimages into a metalized layer of the patch.

13. A security article comprising:
    a substrate;
    a first patch of microprinted microimages arranged in a first microimage array;

a first frontside translucent layer laminated to the substrate and the first patch, the first frontside translucent layer having a first array of microlenses in register with said first patch of microprinted microimages such that pitch and skew angle of the first array of microimages and of the first array of microlenses are essentially equal, thereby, for each microimage of a plurality of microimages on the first patch, a microlens in said first array of microlenses is located above a single microimage;

wherein when the first microimage array is viewed by a viewer through the first microlens array, a first composite image is visible to a viewer of the security article.

14. The security article of claim 13 wherein the first patch is adhered to the substrate by a first layer of heat- or pressure-activated adhesive or the microimage first patch is adhered to the first frontside translucent layer by a first layer of heat- or pressure-activated adhesive.

15. The security article of claim 13 wherein the first patch is formed from a first patch material that is transparent and that does not deform due to lamination conditions to a degree beyond which pitch and skew angle of the first microimage array and first microlens array are not maintained equal.

16. The security article of claim 13 wherein the first frontside translucent layer is a polycarbonate layer, or the substrate is a polycarbonate layer, or the first patch material is polyethylene terephthalate with a thickness of less than 30 microns.

17. The security article of claim 13 wherein the first patch is adhered to a first side of the substrate over a see-through portion in the substrate, the security article further comprising a first backside translucent layer laminated to the substrate and the second patch, the first backside translucent layer having an second array of microlenses in register with said first patch of microprinted microimages such that pitch and skew angle of the first array of microimages and of the second array of microlenses are essentially equal, thereby, for each microimage of the plurality of microimages on the first patch, a microlens in said second array of microlenses is located above a single microimage;

wherein when the first microimage array is viewed by a viewer through the second microlens array, a second composite image is visible to a viewer of the security article wherein the second composite image is a mirror image of the first composite image.

18. The security article of claim 13 wherein the first patch is adhered to a first side of the substrate over a see-through portion in the substrate, wherein the first microimage array is printed on a frontside of the first patch, and wherein the microlenses of the first microlens array are microlenses having a focal length, the security article further comprising:

a second array of microimages microprinted on a backside of the patch opposite to the frontside of the patch;

a first backside translucent layer laminated to the substrate and the first patch, the first backside translucent layer having a second array of microlenses in register with said first patch of microprinted microimages such that pitch and skew angle of the second array of microimages and of the second array of microlenses are essentially equal, thereby, such that for each microimage of the plurality of microimages on the second patch, a microlens in said second array of microlenses is located above a single microimage, wherein the microlenses of the second microlens array are microlenses having a focal length;

wherein the focal length of the microlenses of the first array of microlenses is substantially equal to a distance between the first array of microlenses and the first array of micro images, wherein the focal length of the microlenses of the second array of microlenses is substantially equal to a distance between the second array of microlenses and the second array of micro images;

wherein when the second microimage array is viewed by a viewer through the second microlens array, a second composite image is visible to a viewer of the security article.

19. The security article of claim 13 further comprising:

at least a second frontside translucent layer laminated between the first patch and the first backside translucent layer.

* * * * *